(12) United States Patent
Kassir et al.

(10) Patent No.: US 11,659,354 B2
(45) Date of Patent: May 23, 2023

(54) RANGING ASSISTED PEDESTRIAN LOCALIZATION

(71) Applicant: QUALCOMM Incorporated, San Diego, CA (US)

(72) Inventors: Saadallah Kassir, Austin, TX (US); Anantharaman Balasubramanian, San Diego, CA (US); Kapil Gulati, Belle Mead, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 61 days.

(21) Appl. No.: 17/206,062

(22) Filed: Mar. 18, 2021

(65) Prior Publication Data

US 2022/0303721 A1 Sep. 22, 2022

(51) Int. Cl.
*H04W 24/00* (2009.01)
*H04W 4/02* (2018.01)
*H04W 4/40* (2018.01)

(52) U.S. Cl.
CPC ............. *H04W 4/023* (2013.01); *H04W 4/40* (2018.02)

(58) Field of Classification Search
CPC ................................ H04W 4/023; H04W 4/40
See application file for complete search history.

(56) References Cited

U.S. PATENT DOCUMENTS

2015/0346332 A1* 12/2015 Taylor, Jr. ............... G01S 13/84
342/458
2019/0268726 A1* 8/2019 Jiang ..................... G01S 5/0284

FOREIGN PATENT DOCUMENTS

WO 2017061795 A1 4/2017
WO 2018106467 A1 6/2018

OTHER PUBLICATIONS

International Search Report and Written Opinion—PCT/US2022/014237—ISA/EPO—dated May 18, 2022.

* cited by examiner

*Primary Examiner* — Erika A Washington
(74) *Attorney, Agent, or Firm* — Muncy, Geissler, Olds & Lowe, P.C.

(57) ABSTRACT

Disclosed are techniques for wireless communication. In an aspect, a method of wireless communication performed by a first pedestrian user equipment (PUE) includes performing a ranging operation to a set of UEs, the set including at least a second PUE, and providing ranging data to a third entity, the third entity comprising a vehicle user equipment (VUE) or a road-side unit (RSU). The set of UEs may be randomly selected or selected using a selection algorithm. The set of UEs may be selected by the PUE or by the third entity. The ranging data may include the location of the first PUE, and may include a report on the battery status of the first PUE. The third entity may use the ranging data to update estimated positions of the first PUE and the set of UEs.

5 Claims, 15 Drawing Sheets

US 11,659,354 B2

RANGING ASSISTED PEDESTRIAN LOCALIZATION

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a pedestrian user equipment (PUE) includes a memory; at least one transceiver; and at least one processor communicatively coupled to the memory and the at least one transceiver, the at least one processor configured to: perform a ranging operation to a set of user equipment (UEs), the set comprising at least a second PUE; and provide ranging data to a third entity, the third entity comprising a vehicle user equipment (VUE) or a road-side unit (RSU).

In an aspect, a vehicle user equipment (VUE) includes a memory; at least one transceiver; and at least one processor communicatively coupled to the memory and the at least one transceiver, the at least one processor configured to: send, to a first pedestrian user equipment (PUE), a request to perform a ranging operation to a set of user equipment (UEs), the set comprising at least a second PUE; receive, from the first PUE, ranging data indicating a range from the first PUE to each member of the set of UEs; and determine, based on the ranging data, an estimated position for each UE in the set of UEs.

In an aspect, a road-side unit (RSU) includes a memory; at least one transceiver; and at least one processor communicatively coupled to the memory and the at least one transceiver, the at least one processor configured to: send, to a first pedestrian user equipment (PUE), a request to perform a ranging operation to a set of user equipment (UEs), the set comprising at least a second PUE; receive, from the first PUE, ranging data indicating a range from the first PUE to each member of the set of UEs; and send, to a vehicle UE (VUE), the ranging data, an estimated position of each member of the set of UEs, or combinations thereof.

In an aspect, a method of wireless communication performed by a first user equipment (UE) includes sending, to a second UE, a request to perform a ranging operation to a set of user equipment (UEs), the set comprising at least a pedestrian UE (PUE); receiving, from the second UE, ranging data indicating a range from the second UE to each member of the set of UEs; and determining, based on the ranging data, an estimated position for each UE in the set of UEs.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
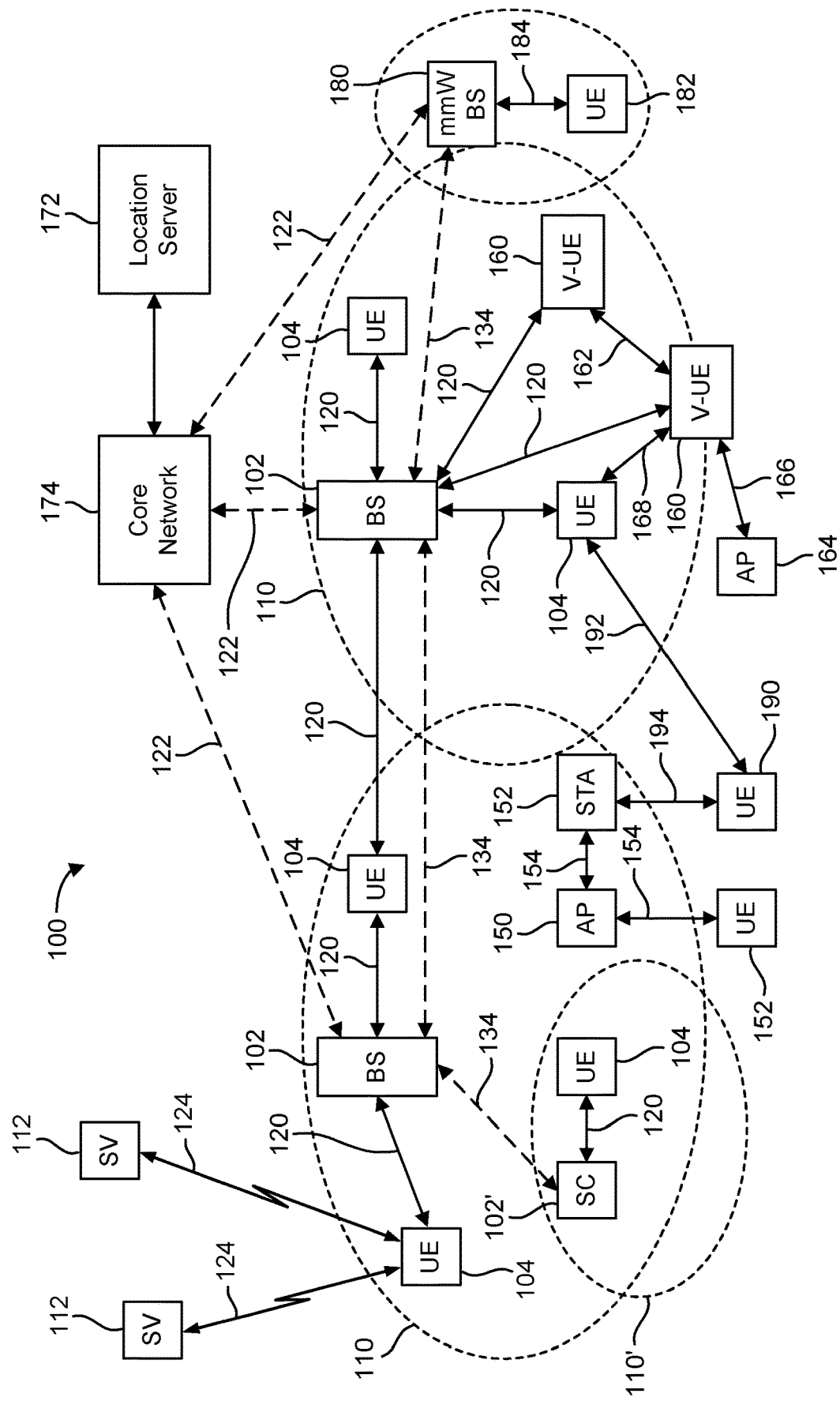
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A "vulnerable road user" (VRU) is a term applied to those most at risk in traffic, i.e. those unprotected by an outside shield. Pedestrians, pedal cyclists, and motor cyclists are accordingly considered as vulnerable since they benefit from little or no external protective devices that would absorb energy in a collision. VRUs include non-motorized road users, such as pedestrians and cyclists as well as motorcyclists and persons with disabilities or reduced mobility and orientation.

A "vehicle UE" (VUE) is a type of UE and may be any in-vehicle wireless communication device, such as a navigation system, a warning system, a heads-up display (HUD), an on-board computer, etc. Alternatively, a VUE may be a portable wireless communication device (e.g., a cell phone, tablet computer, etc.) that is carried by the driver of the vehicle or a passenger in the vehicle. The term "VUE" may refer to the in-vehicle wireless communication device or the vehicle itself, depending on the context.

A "pedestrian UE" (PUE) is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A "road-side unit" (RSU) is a computing device located on the roadside that provides connectivity support to passing vehicles (e.g., VUEs), PUEs, and other types of UEs in the vicinity, e.g., supporting vehicle to infrastructure (V2I) communications.

As used herein, the terms UE, VUE, PUE, RSU, and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some aspects that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 174 (e.g., an evolved packet core (EPC) or 5G core (5GC)) through backhaul links 122, and through the core network 174 to one or more location servers 172 (which may be part of core network 174 or may be external to core network 174). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive signals for deriving geo location information from the SVs 112. An SPS typically includes a system of transmitters (e.g., SVs 112) positioned to enable receivers (e.g., UEs 104) to determine their location on or above the Earth based, at least in part, on signals received from the transmitters. Such a transmitter typically transmits a signal 124 marked with a repeating pseudo-random noise (PN) code of a set number of chips. While typically located in SVs 112, transmitters may sometimes be located on ground-based control stations, base stations 102, and/or other UEs 104.

The use of SPS signals can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple VUEs 160 that may communicate with base stations 102 over communication links 120 (e.g., using the UVU interface). VUEs 160 may also communicate directly with each other over a wireless sidelink 162, with a roadside access point 164 (also referred to as a "roadside unit") over a wireless sidelink 166, or with UEs 104 over a wireless sidelink 168. A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for D2D media-sharing, V2V communication, V2X communication (e.g., cellular V2X (cV2X) communication, enhanced V2X (eV2X) communication, etc.), emergency rescue applications, etc. One or more of a group of VUEs 160 utilizing sidelink communications may be within the geographic coverage area 110 of a base station 102. Other VUEs 160 in such a group may be outside the geographic coverage area 110 of a base station 102 or be otherwise unable to receive transmissions from a base station 102. In some cases, groups of VUEs 160 communicating via sidelink communications may utilize a one-to-many (1:M) system in which each VUE 160 transmits to every other VUE 160 in the group. In some cases, a base station 102 facilitates the scheduling of resources for sidelink communications. In other cases, sidelink communications are carried out between VUEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-MI) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the VUEs 160 are referred to as V2V communications, communications between the VUEs 160 and the one or more roadside access points 164 are referred to as V2I communications, and communications between the VUEs 160 and one or more UEs 104 (where the UEs 104 are PUEs) are referred to as V2P communications. The V2V communications between VUEs 160 may include, for example, information about the position, speed, acceleration, heading, and other vehicle data of the VUEs 160. The V2I information received at a VUE 160 from the one or more roadside access points 164 may include, for example, road rules, parking automation information, etc. The V2P communications between a VUE 160 and a UE 104 may include information about, for example, the position, speed, acceleration, and heading of the VUE 160 and the position, speed (e.g., where the UE 104 is carried by a user on a bicycle), and heading of the UE 104.

Note that although FIG. 1 only illustrates two of the UEs as VUEs (VUEs 160), any of the illustrated UEs (e.g., UEs 104, 152, 182, 190) may be VUEs. In addition, while only the VUEs 160 and a single UE 104 have been illustrated as being connected over a sidelink, any of the UEs illustrated in FIG. 1, whether VUEs, PUEs, etc., may be capable of sidelink communication. Further, although only UE 182 was described as being capable of beam forming, any of the illustrated UEs, including VUEs 160, may be capable of beam forming. Where VUEs 160 are capable of beam forming, they may beam form towards each other (i.e., towards other VUEs 160), towards roadside access points 164, towards other UEs (e.g., UEs 104, 152, 182, 190), etc. Thus, in some cases, VUEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
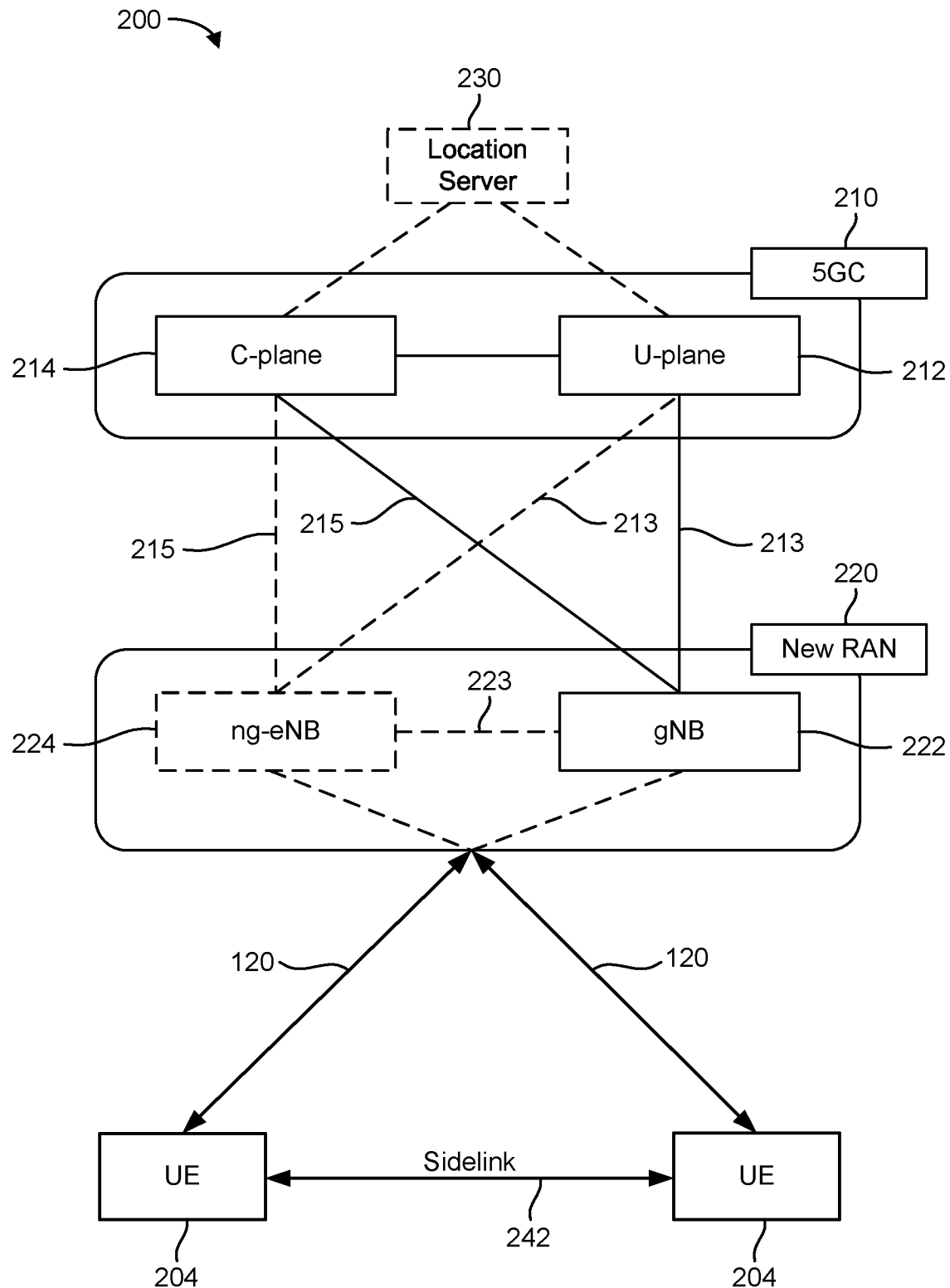
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions (C-plane) 214 (e.g., UE registration, authentication, network access, gateway selection, etc.) and user plane functions (U-plane) 212 (e.g., UE gateway function, access to data networks, IP routing, etc.), which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either (or both) gNB 222 or ng-eNB 224 may communicate with UEs 204 (e.g., any of the UEs described herein). In an aspect, two or more UEs 204 may communicate with each other over a wireless sidelink 242, which may correspond to wireless sidelink 162 in FIG. 1.

Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
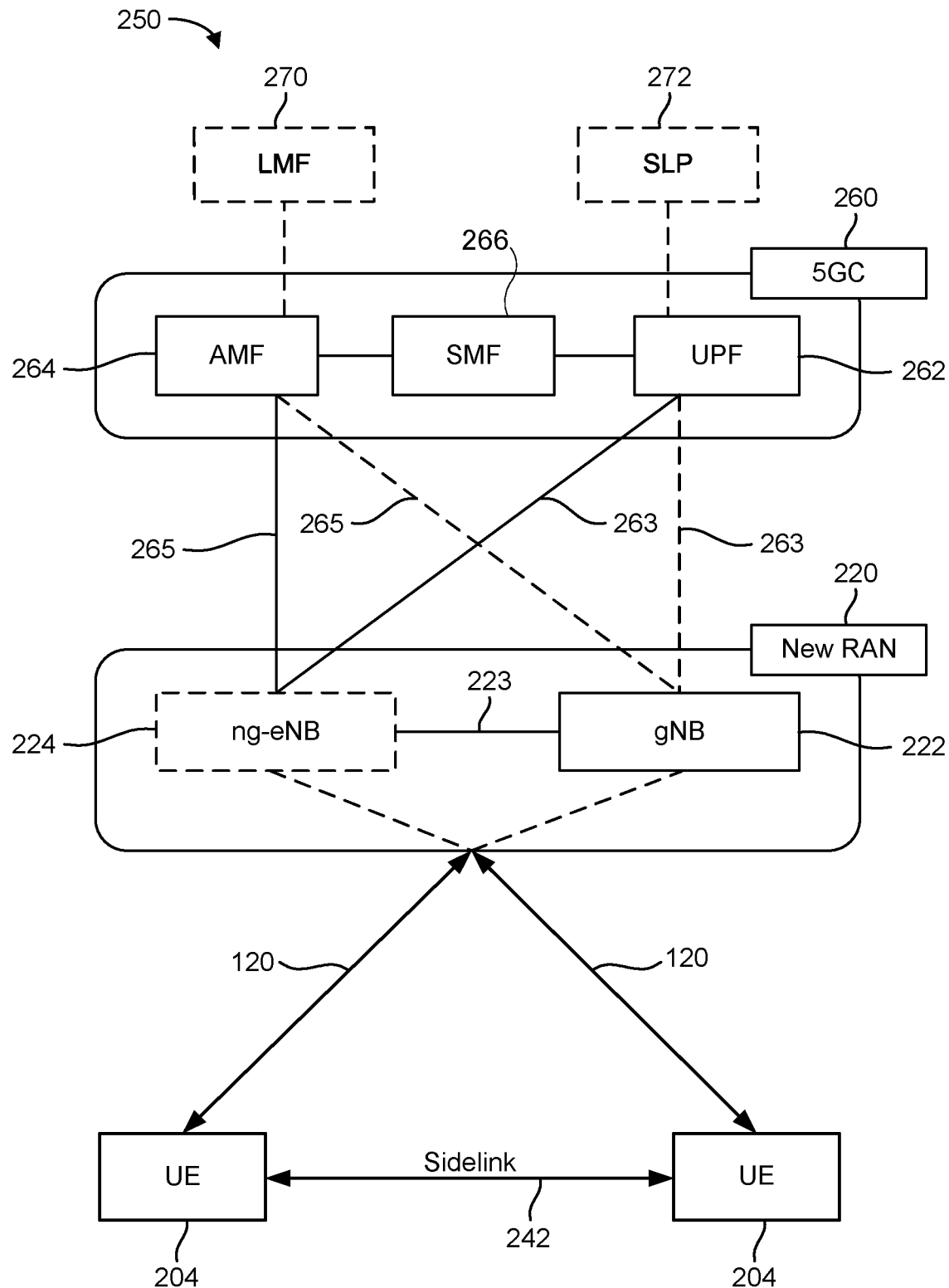

FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. The base stations of the New RAN 220 communicate with the AMF 264 over the N2 interface and with the UPF 262 over the N3 interface. Either (or both) gNB 222 or ng-eNB 224 may communicate with UEs 204 (e.g., any of the UEs described herein). In an aspect, two or more UEs 204 may communicate with each other over a sidelink 242, which may correspond to sidelink 162 in FIG. 1.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 which acts as a location server 230, transport for location services messages between the New RAN 220 and the LMF 270, evolved packet system (EPS) bearer identifier allocation for interworking with the EPS, and UE 204 mobility event notification. In addition, the AMF 264 also supports functionalities for non-third generation partnership project (3GPP) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270 but, whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g. using protocols intended to carry voice and/or data like the transmission control protocol (TCP) and/or IP).

Figure 3:
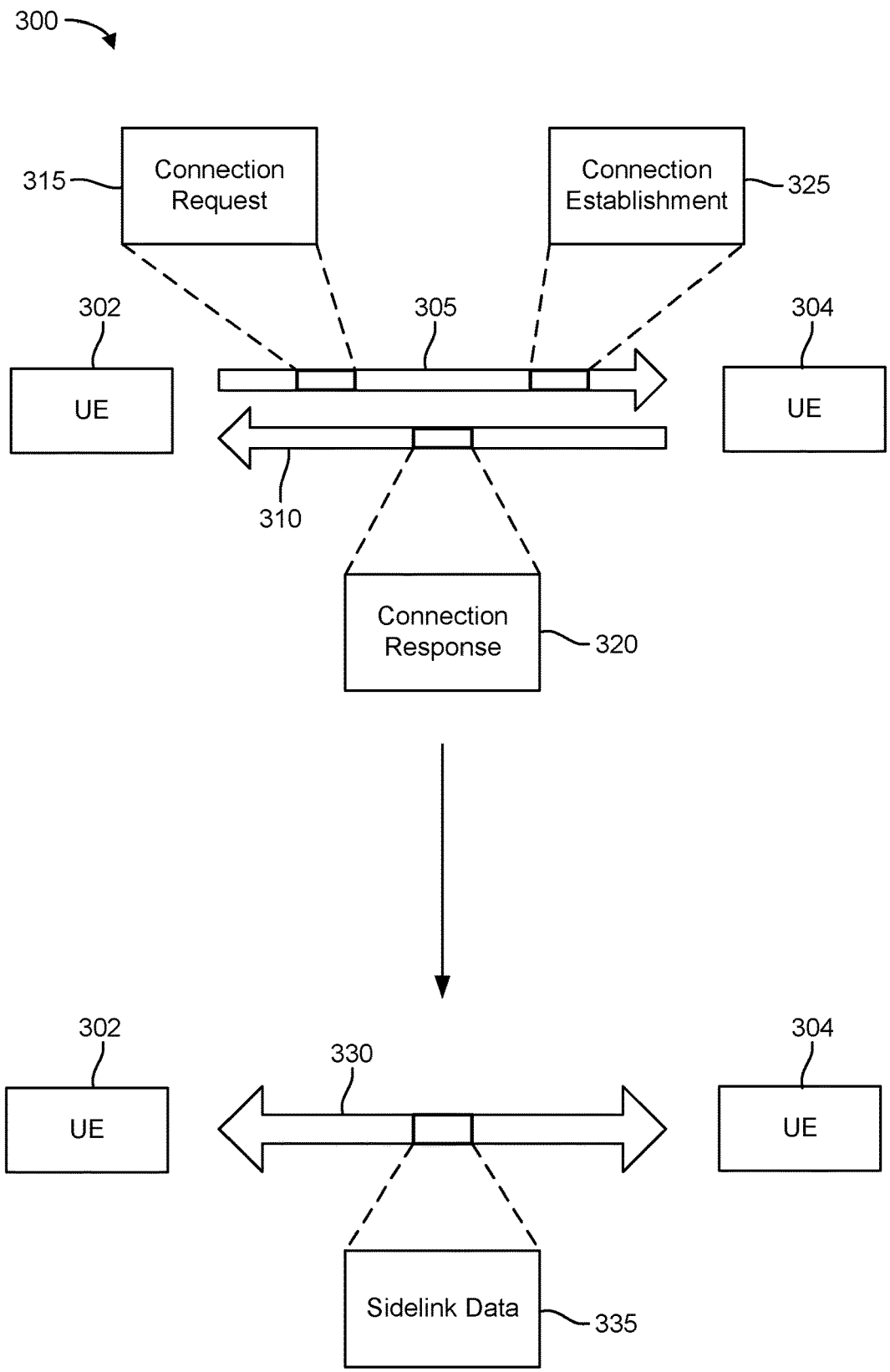
FIG. 3 illustrates an example of a wireless communications system that supports unicast sidelink establishment, according to aspects of the disclosure.

FIG. 3 illustrates an example of a wireless communications system 300 that supports wireless unicast sidelink establishment, according to aspects of the disclosure. In some examples, wireless communications system 300 may implement aspects of wireless communications systems 100, 200, and 250. Wireless communications system 300 may include a first UE 302 and a second UE 304, which may be examples of any of the UEs described herein. As specific examples, UEs 302 and 304 may correspond to VUEs 160 in FIG. 1, UE 190 and UE 104 in FIG. 1 connected over sidelink 192, or UEs 204 in FIGS. 2A and 2B.

In the example of FIG. 3, the UE 302 may attempt to establish a unicast connection over a sidelink with the UE 304, which may be a V2X sidelink between the UE 302 and UE 304. As specific examples, the established sidelink connection may correspond to sidelinks 162 and/or 168 in FIG. 1 or sidelink 242 in FIGS. 2A and 2B. The sidelink connection may be established in an omni-directional frequency range (e.g., FR1) and/or a mmW frequency range (e.g., FR2). In some cases, the UE 302 may be referred to as an initiating UE that initiates the sidelink connection procedure, and the UE 304 may be referred to as a target UE that is targeted for the sidelink connection procedure by the initiating UE.

For establishing the unicast connection, access stratum (AS) (a functional layer in the UMTS and LTE protocol stacks between the RAN and the UE that is responsible for transporting data over wireless links and managing radio resources, and which is part of Layer 2) parameters may be configured and negotiated between the UE 302 and UE 304. For example, a transmission and reception capability matching may be negotiated between the UE 302 and UE 304. Each UE may have different capabilities (e.g., transmission and reception, 64 quadrature amplitude modulation (QAM), transmission diversity, carrier aggregation (CA), supported communications frequency band(s), etc.). In some cases, different services may be supported at the upper layers of corresponding protocol stacks for UE 302 and UE 304. Additionally, a security association may be established between UE 302 and UE 304 for the unicast connection. Unicast traffic may benefit from security protection at a link level (e.g., integrity protection). Security requirements may differ for different wireless communications systems. For example, V2X and uGu systems may have different security requirements (e.g., ulu security does not include confidentiality protection). Additionally, IP configurations (e.g., IP versions, addresses, etc.) may be negotiated for the unicast connection between UE 302 and UE 304.

In some cases, UE 304 may create a service announcement (e.g., a service capability message) to transmit over a cellular network (e.g., cV2X) to assist the sidelink connection establishment. Conventionally, UE 302 may identify and locate candidates for sidelink communications based on a basic service message (BSM) broadcasted unencrypted by nearby UEs (e.g., UE 304). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 302 is able to detect the BSM(s). Accordingly, the service announcement transmitted by UE 304 and other nearby UEs (e.g., a discovery signal) may be an upper layer signal and broadcasted (e.g., in an NR sidelink broadcast). In some cases, the UE 304 may include one or more parameters for itself in the service announcement, including connection parameters and/or capabilities it possesses. The UE 302 may then monitor for and receive the broadcasted service announcement to identify potential UEs for corresponding sidelink connections. In some cases, the UE 302 may identify the potential UEs based on the capabilities each UE indicates in their respective service announcements.

The service announcement may include information to assist the UE 302 (e.g., or any initiating UE) to identify the UE transmitting the service announcement (UE 304 in the example of FIG. 3). For example, the service announcement may include channel information where direct communication requests may be sent. In some cases, the channel information may be RAT-specific (e.g., specific to LTE or NR) and may include a resource pool within which UE 302 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for the UE 302 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential sidelink connection target (UE 304 in the example of FIG. 3), the initiating UE (UE 302 in the example of FIG. 3) may transmit a connection request 315 to the identified target UE 304. In some cases, the connection request 315 may be a first RRC message transmitted by the UE 302 to request a unicast connection with the UE 304 (e.g., an "RRCDirectConnectionSetupRequest" message). For example, the unicast connection may utilize the PC5 interface for the sidelink, and the connection request 315 may be an RRC connection setup request message. Additionally, the UE 302 may use a sidelink signaling radio bearer 305 to transport the connection request 315.

After receiving the connection request 315, the UE 304 may determine whether to accept or reject the connection request 315. The UE 304 may base this determination on a transmission/reception capability, an ability to accommodate the unicast connection over the sidelink, a particular service indicated for the unicast connection, the contents to be transmitted over the unicast connection, or a combination thereof. For example, if the UE 302 wants to use a first RAT to transmit or receive data, but the UE 304 does not support the first RAT, then the UE 304 may reject the connection request 315. Additionally or alternatively, the UE 304 may reject the connection request 315 based on being unable to accommodate the unicast connection over the sidelink due to limited radio resources, a scheduling issue, etc. Accordingly, the UE 304 may transmit an indication of whether the request is accepted or rejected in a connection response 320. Similar to the UE 302 and the connection request 315, the UE 304 may use a sidelink signaling radio bearer 310 to transport the connection response 320. Additionally, the connection response 320 may be a second RRC message transmitted by the UE 304 in response to the connection request 315 (e.g., an "RRCDirectConnectionResponse" message).

In some cases, sidelink signaling radio bearers 305 and 310 may be the same sidelink signaling radio bearer or may be separate sidelink signaling radio bearers. Accordingly, a radio link control (RLC) layer acknowledged mode (AM) may be used for sidelink signaling radio bearers 305 and 310. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 320 indicates that the UE 304 accepted the connection request 315, the UE 302 may then transmit a connection establishment 325 message on the sidelink signaling radio bearer 305 to indicate that the unicast connection setup is complete. In some cases, the connection establishment 325 may be a third RRC message (e.g., an "RRCDirectConnectionSetupComplete" message). Each of the connection request 315, the connection response 320, and the connection establishment 325 may use a basic capability when being transported from one UE to the other UE to enable each UE to be able to receive and decode the corresponding transmission (e.g., the RRC messages).

Additionally, identifiers may be used for each of the connection request 315, the connection response 320, and the connection establishment 325. For example, the identifiers may indicate which UE 302/304 is transmitting which message and/or for which UE 302/304 the message is intended. For physical (PHY) layer channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical layer ACK may be used for ensuring the corresponding messages are transmitted and received properly.

One or more information elements may be included in the connection request 315 and/or the connection response 320 for UE 302 and/or UE 304, respectively, to enable negotiation of corresponding AS layer parameters for the unicast connection. For example, the UE 302 and/or UE 304 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, the UE 302 and/or UE 304 may include RLC parameters when establishing the unicast connection to set an RLC context for the unicast connection. For example, the RLC context may indicate whether an AM (e.g., a reordering timer (t-reordering) is used) or an unacknowledged mode (UM) is used for the RLC layer of the unicast communications.

Additionally, the UE 302 and/or UE 304 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (HACK) feedback), parameters for the HARQ feedback scheme, carrier aggregation, or a combination thereof for the unicast connection. Additionally, the UE 302 and/or UE 304 may include PHY layer parameters when establishing the unicast connection to set a PHY layer context for the unicast connection. For example, the PHY layer context may indicate a transmission format (unless transmission profiles are included for each UE 302/304) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 325 message is transmitted). Before a security association (e.g., security context) is established between the UE 302 and UE 304, the sidelink signaling radio bearers 305 and 310 may not be protected. After a security association is established, the sidelink signaling radio bearers 305 and 310 may be protected. Accordingly, the security context may enable secure data transmissions over the unicast connection and the sidelink signaling radio bearers 305 and 310. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, the UE 304 may base its decision on whether to accept or reject the connection request 315 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, the UE 302 and UE 304 may communicate using the unicast connection over a sidelink 330, where sidelink data 335 is transmitted between the two UEs 302 and 304. The sidelink 330 may correspond to sidelinks 162 and/or 168 in FIG. 1 and/or sidelink 242 in FIGS. 2A and 2B. In some cases, the sidelink data 335 may include RRC messages transmitted between the two UEs 302 and 304. To maintain this unicast connection on sidelink 330, UE 302 and/or UE 304 may transmit a keep alive message (e.g., "RRCDirectLinkAlive" message, a fourth RRC message, etc.). In some cases, the keep alive message may be triggered periodically or on-demand (e.g., event-triggered). Accordingly, the triggering and transmission of the keep alive message may be invoked by UE 302 or by both UE 302 and UE 304. Additionally or alternatively, a MAC control element (CE) (e.g., defined over sidelink 330) may be used to monitor the status of the unicast connection on sidelink 330 and maintain the connection. When the unicast connection is no longer needed (e.g., UE 302 travels far enough away from UE 304), either UE 302 and/or UE 304 may start a release procedure to drop the unicast connection over sidelink 330. Accordingly, subsequent RRC messages may not be transmitted between UE 302 and UE 304 on the unicast connection.

Figure 4A:
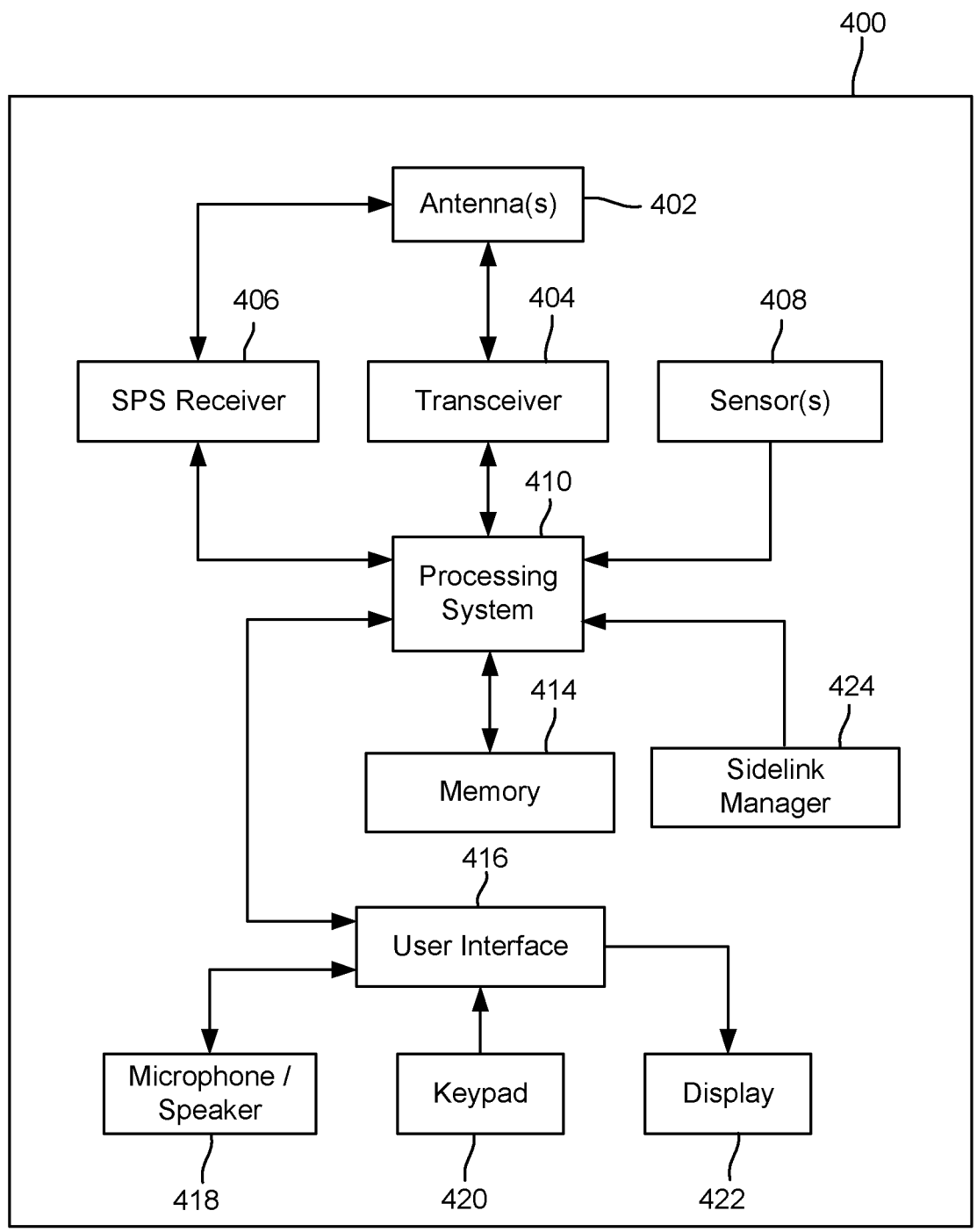
FIG. 4A is a block diagram illustrating various components of an example user equipment (UE), according to aspects of the disclosure.

FIG. 4A is a block diagram illustrating various components of an example UE 400, according to aspects of the disclosure. In an aspect, the UE 400 may correspond to any of the UEs described herein, including, but not limited to, a VUE or a PUE. As a specific example, the UE 400 may be a VUE, such as VUE 160 in FIG. 1. For the sake of simplicity, the various features and functions illustrated in the block diagram of FIG. 4A are connected together using a common data bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 4A may be further subdivided, or two or more of the features or functions illustrated in FIG. 4A may be combined.

The UE 400 may include at least one transceiver 404 connected to one or more antennas 402 and providing means for communicating (e.g., means for transmitting, means for receiving, means for measuring, means for tuning, means for refraining from transmitting, etc.) with other network nodes, such as VUEs (e.g., VUEs 160), infrastructure access points (e.g., roadside access point 164, which may also be referred to herein as a road-side unit (RSU)), PUEs (e.g., UEs 104), base stations (e.g., base stations 102), etc., via at least one designated RAT (e.g., cV2X or IEEE 802.11p) over one or more communication links (e.g., communication links 120, sidelinks 162, 166, 168, mmW communication link 184). The transceiver 404 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include at least one transmitter and at least one receiver in an integrated device (e.g., embodied as a transmitter circuit and a receiver circuit of a single communication device) in some aspects, may comprise a separate transmitter device and a separate receiver device in some aspects, or may be embodied in other ways in other aspects. In an aspect, a transmitter may include or be coupled to a plurality of antennas (e.g., antenna(s) 402), such as an antenna array, that permits the UE 400 to perform transmit "beamforming," as described herein. Similarly, a receiver may include or be coupled to a plurality of antennas (e.g., antenna(s) 402), such as an antenna array, that permits the UE 400 to perform receive beamforming, as described herein. In an aspect, the transmitter(s) and receiver(s) may share the same plurality of antennas (e.g., antenna(s) 402), such that the UE 400 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The UE 400 may also include a satellite positioning service (SPS) receiver 406. The SPS receiver 406 may be connected to the one or more antennas 402 and may provide means for receiving and/or measuring satellite signals. The SPS receiver 406 may comprise any suitable hardware and/or software for receiving and processing SPS signals, such as global positioning system (GPS) signals. The SPS receiver 406 requests information and operations as appropriate from the other systems, and performs the calculations necessary to determine the UE's 400 position using measurements obtained by any suitable SPS algorithm.

One or more sensors 408 may be coupled to a processing system 410 and may provide means for sensing or detecting information related to the state and/or environment of the UE 400, such as speed, heading (e.g., compass heading), headlight status, gas mileage, etc. By way of example, the one or more sensors 408 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The processing system 410 may include one or more microprocessors, microcontrollers, ASICs, processing cores, digital signal processors, or the like that provide processing functions, as well as other calculation and control functionality. The processing system 410 may therefore provide means for processing, such as means for determining, means for calculating, means for receiving, means for transmitting, means for indicating, etc. The processing system 410 may include any form of logic suitable for performing, or causing the components of the UE 400 to perform, at least the techniques described herein.

The processing system 410 may also be coupled to a memory 414 providing means for storing (including means for retrieving, means for maintaining, etc.) data and software instructions for executing programmed functionality within the UE 400. The memory 414 may be on-board the processing system 410 (e.g., within the same integrated circuit (IC) package), and/or the memory 414 may be external to the processing system 410 and functionally coupled over a data bus.

The UE 400 may include a user interface 416 that provides any suitable interface systems, such as a microphone/speaker 418, keypad 420, and display 422 that allow user interaction with the UE 400. The microphone/speaker 418 may provide for voice communication services with the UE 400. The keypad 420 may comprise any suitable buttons for user input to the UE 400. The display 422 may comprise any suitable display, such as, for example, a backlit liquid crystal display (LCD), and may further include a touch screen display for additional user input modes. The user interface 416 may therefore be a means for providing indications (e.g., audible and/or visual indications) to a user and/or for receiving user input (e.g., via user actuation of a sensing device such a keypad, a touch screen, a microphone, and so on).

In an aspect, the UE 400 may include a sidelink manager 424 coupled to the processing system 410. The sidelink manager 424 may be a hardware, software, or firmware component that, when executed, causes the UE 400 to perform the operations described herein. For example, the sidelink manager 424 may be a software module stored in memory 414 and executable by the processing system 410. As another example, the sidelink manager 424 may be a hardware circuit (e.g., an ASIC, a field-programmable gate array (FPGA), etc.) within the UE 400.

Figure 4B:
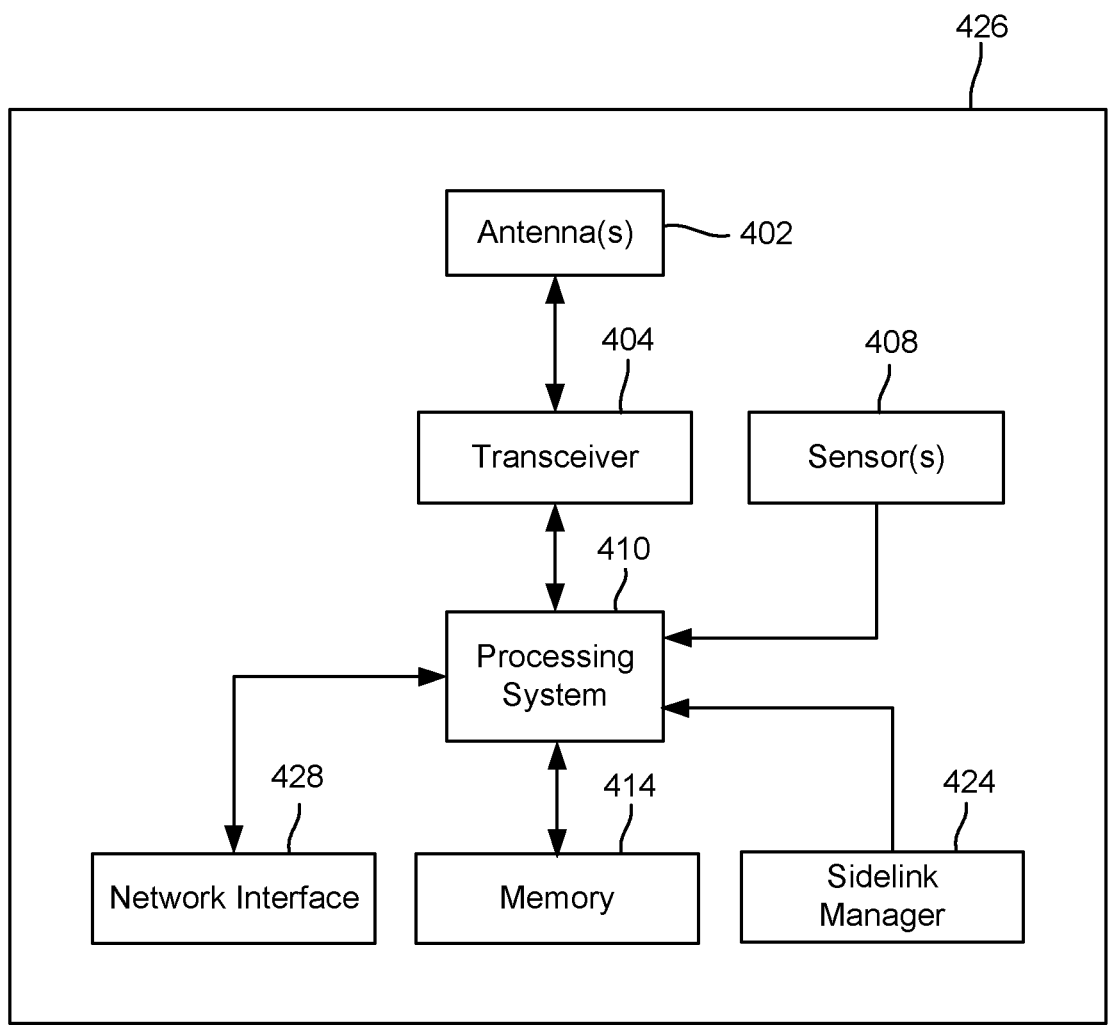
FIG. 4B is a block diagram illustrating various components of an example road-side unit (RSU), according to aspects of the disclosure.

FIG. 4B is a block diagram illustrating various components of an example roadside assistance unit (RSU) 426, according to aspects of the disclosure. For the sake of simplicity, the various features and functions illustrated in the block diagram of FIG. 4B are connected together using a common data bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 4B may be further subdivided, or two or more of the features or functions illustrated in FIG. 4B may be combined.

The RSU 426 may include at least one transceiver 404 connected to one or more antennas 402 and providing means for communicating (e.g., means for transmitting, means for receiving, means for measuring, means for tuning, means for refraining from transmitting, etc.) with other network nodes, such as VUEs (e.g., VUEs 160), PUEs (e.g., UEs 104), base stations (e.g., base stations 102), etc., via at least one designated RAT (e.g., cV2X or IEEE 802.11p) over one or more communication links (e.g., communication links 120, sidelinks 162, 166, 168, mmW communication link 184). The transceiver 404 may be variously configured for transmitting and encoding signals (e.g., messages, indications, information, and so on), and, conversely, for receiving and decoding signals (e.g., messages, indications, information, pilots, and so on) in accordance with the designated RAT.

One or more sensors 408 may be coupled to a processing system 410 and may provide means for sensing or detecting information related to the state and/or environment of the VRUs in the vicinity of the RSU 426, such as speed, heading (e.g., compass heading), etc. By way of example, the one or more sensors 408 may include a camera or other image sensor, a radio detection and ranging (RADAR), light detection and ranging (LIDAR), ultrasonic, or other type of rangefinder, proximity sensors, pressure sensors, etc.

The processing system 410 may include one or more microprocessors, microcontrollers, ASICs, processing cores, digital signal processors, or the like that provide processing functions, as well as other calculation and control functionality. The processing system 410 may therefore provide means for processing, such as means for determining, means for calculating, means for receiving, means for transmitting, means for indicating, etc. The processing system 410 may include any form of logic suitable for performing, or causing the components of the RSU 426 to perform, at least the techniques described herein.

The processing system 410 may also be coupled to a memory 414 providing means for storing (including means for retrieving, means for maintaining, etc.) data and software instructions for executing programmed functionality within the RSU 426. The memory 414 may be on-board the processing system 410 (e.g., within the same integrated circuit (IC) package), and/or the memory 414 may be external to the processing system 410 and functionally coupled over a data bus.

In an aspect, the RSU 426 may include a sidelink manager 424 coupled to the processing system 410. The sidelink manager 424 may be a hardware, software, or firmware component that, when executed, causes the RSU 426 to perform the operations described herein. For example, the sidelink manager 424 may be a software module stored in memory 414 and executable by the processing system 410. As another example, the sidelink manager 424 may be a hardware circuit (e.g., an ASIC, a field-programmable gate array (FPGA), etc.) within the RSU 426.

In an aspect, the RSU 426 may include a network interface 428 for communicating with other entities, such as network entities within a telecommunications network, a data network, the Internet, etc. The network interface 428 may be configured for wired communication, wireless communication, or both.

V2P communication is a powerful tool for ensuring pedestrian safety. Using V2P, a VUE can track the position and velocity of pedestrians with PUEs (VRUs) in the VUE's vicinity and can warn VRUs of potential collision with the VUE. A VRU can transmit its position, e.g., obtained via GPS, along with its identity to a VUE periodically via public safety messages (PSMs). However, VRU tracking needs to be very accurate to ensure an accurate prediction (and subsequent avoidance, if possible) of a potential collision between a vehicle and a pedestrian. It is therefore desirable for a vehicle to use other kinds of information, as well as information from other sources, to track the VRU more accurately. One such type of information is ranging information, e.g., information from which the distance between a VUE and a VRU can be derived.

Figure 5:
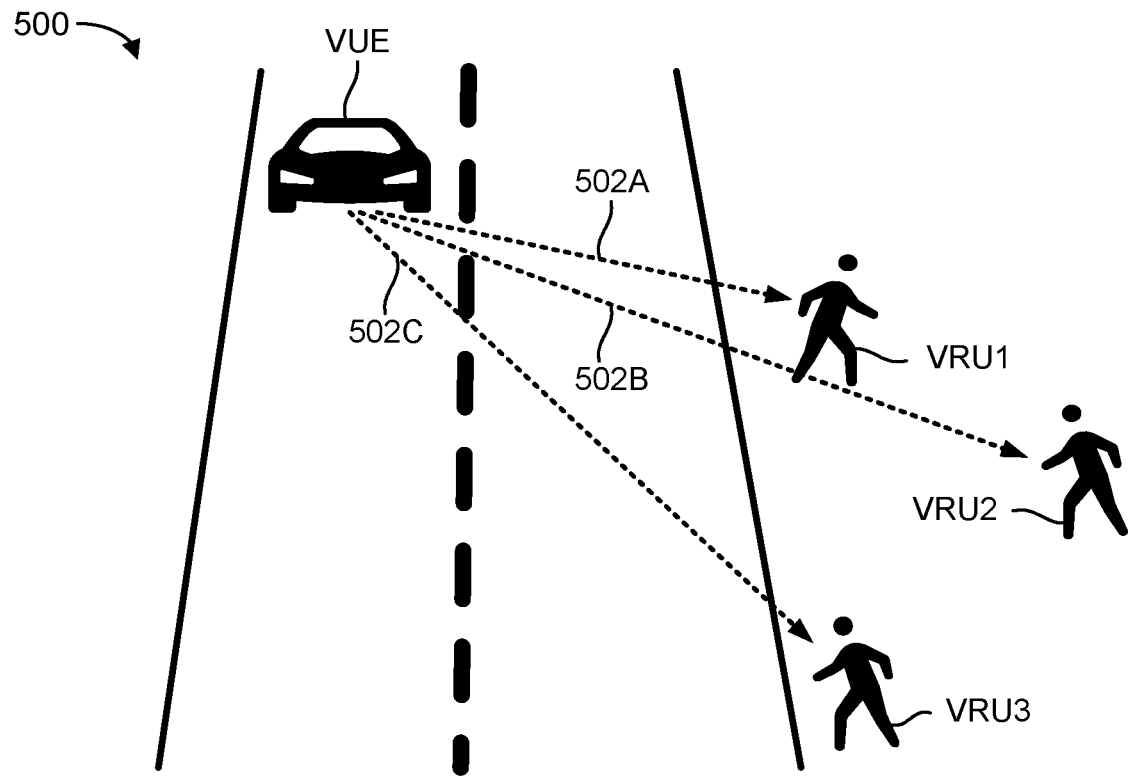
FIGS. 5 to 8 illustrate conventional methods of pedestrian localization.
Figure 6:
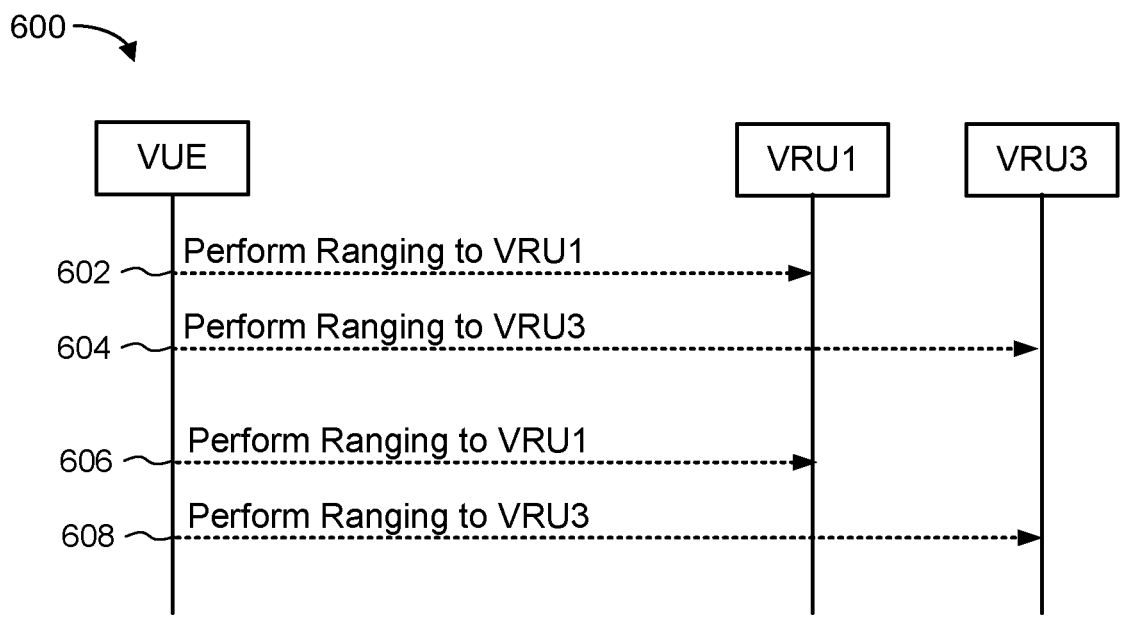

FIGS. 5 and 6 illustrate a conventional method for pedestrian localization. In the scenario illustrated in FIG. 5, a VUE is in the vicinity of three pedestrians, VRU1, VRU2, and VRU3. In the conventional method 500, the VUE performs ranging operation 502A to VRU1, ranging operation 502B to VRU2, and ranging operation 502C to VRU3, to determine the range of each VRU relative to the VUE. Example of ranging operations include, but are not limited to, using a time difference of arrival (TDoA), an angle of arrival (AoA) technique, etc.

FIG. 6 illustrates a conventional method 600 for pedestrian localization, using the scenario illustrated in FIG. 5. In FIG. 6, the VUE performs a ranging operation to VRUs VRU1 (block 602) through VRU3 (block 604). The VUE then repeats this set of ranging operations (block 606 and block 608) continually until the VUE is out of range of the VRUs.

Figure 7:
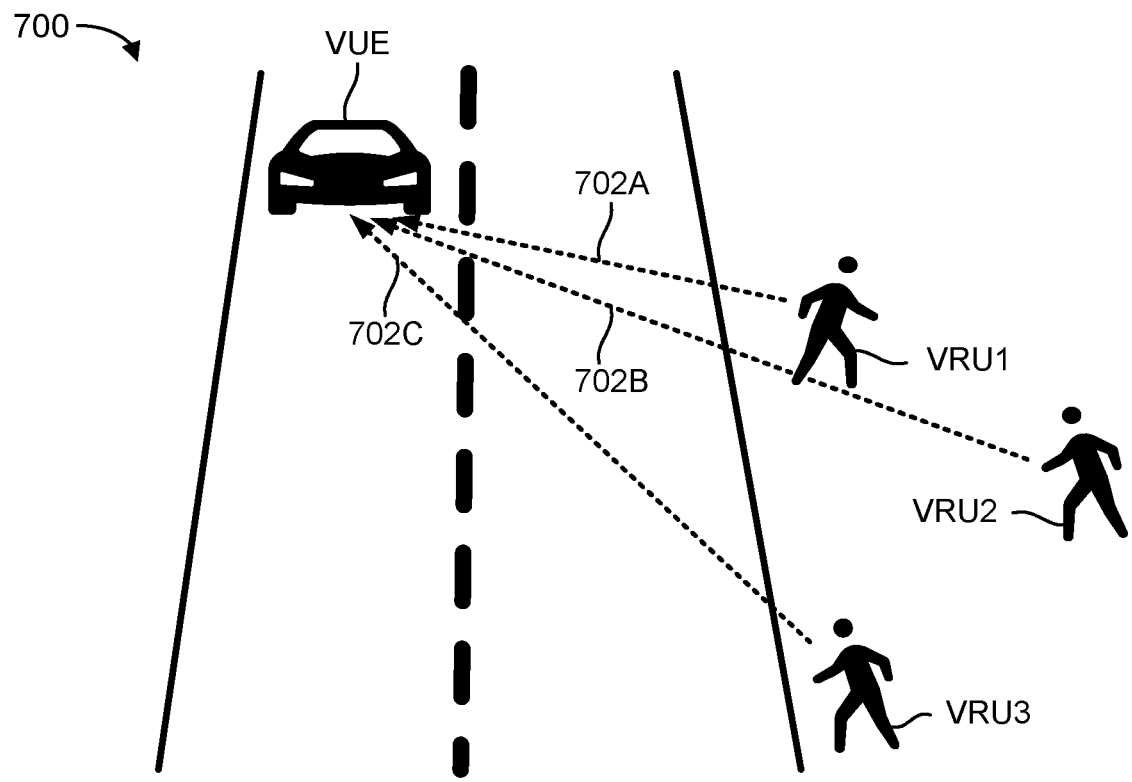
Figure 8:
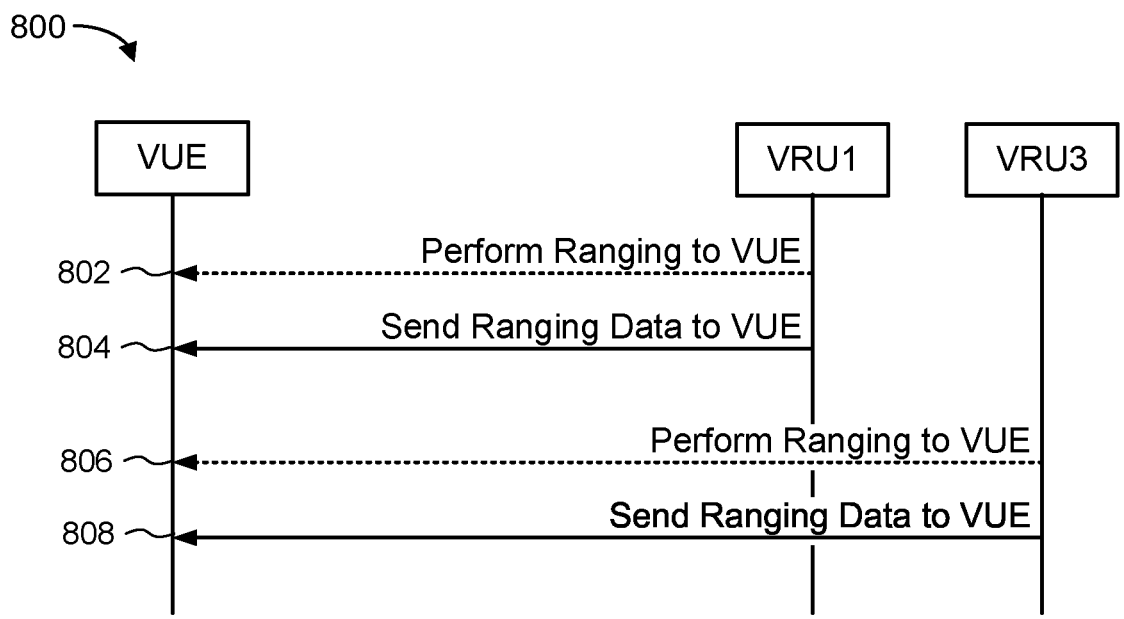

FIGS. 7 and 8 illustrate another conventional method for pedestrian localization. In the scenario illustrated in FIG. 7, a VUE is in the vicinity of pedestrians VRU1, VRU2, and VRU3. In the conventional method 700, one or more of the VRUs perform a ranging operation, e.g., 702A, 702B, 702C, etc., to the VUE and report the results of the ranging operation to the VUE.

FIG. 8 illustrates a conventional method 800 for pedestrian localization, using the scenario illustrated in FIG. 7. Each of the VRUs performs a ranging operation to the VUE, then sends the ranging data to the VUE. In FIG. 8, VRU1 performs a ranging operation to the VUE (block 802), then reports the results of that ranging operation to the VUE (block 804). The other VRUs do the same, ending with VRU3 performing a ranging operation to the VUE (block 806), then reports the results of that ranging operation to the VUE (block 808). The VRUs may repeat these operations periodically or aperiodically upon request to do so by the VUE.

There are technical disadvantages to the conventional methods disclosed above. For example, in order to determine the location of every VRU in its vicinity, a VUE must receive ranging data from each VRU individually. In addition, each VUE in the vicinity of a VRU may make a similar request for ranging information, meaning that a VRU may be requested to perform a ranging operation many times, for many different VUEs; for battery-powered VRUs, this can be significant drain on its battery.

Figure 9:
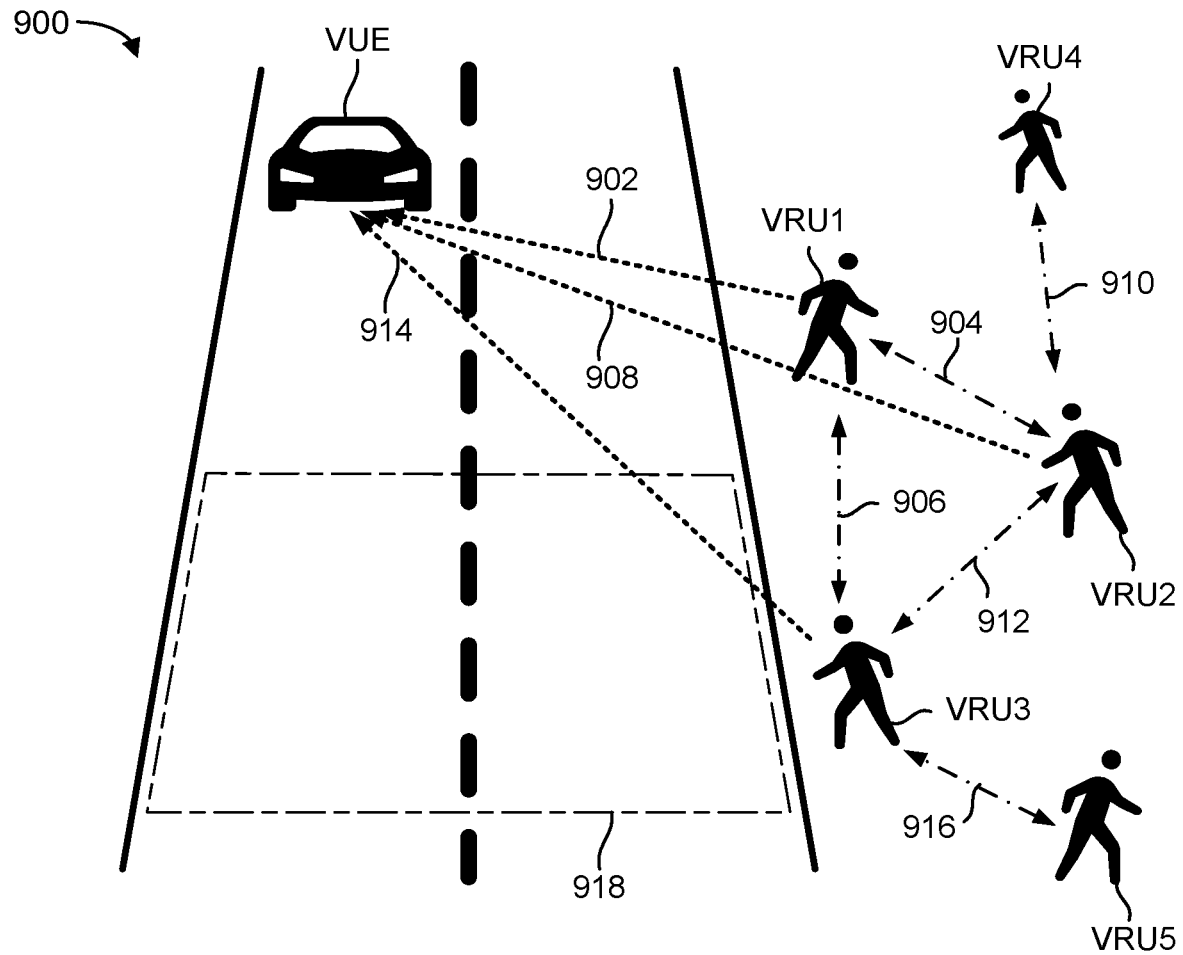
FIGS. 9 to 17 illustrate methods for ranging-assisted pedestrian localization according to aspects of the disclosure.

FIG. 9 illustrates a method 900 for pedestrian localization according to some aspects of the disclosure. FIG. 9 illustrates an aspect in which a VRU may collect range information to a subset of VRUs in its vicinity and provide that information to a VUE along with range information from the VRU to the VUE. In the scenario illustrated in FIG. 9, a VUE is in the vicinity of pedestrians VRU1, VRU2, and VRU3. According to method 900, when a VUE comes into the P2V range of a VRU, that VRU will begin periodically measuring the distance from that VRU to the VUE and also measuring the distance between that VRU and some of the other VRUs nearby.

In FIG. 9, for example, when the VUE is in V2P range with VRU1, VRU1 periodically performs a ranging operation 902 to the VUE, a ranging operation 904 to VRU2, and a ranging operation 906 to VRU3, and reports the results of those ranging operations to the VUE. VRU1 does not perform a ranging operation to every VRU in its vicinity: for example, in FIG. 9, VRU1 does not perform a ranging operation to VRU4 or VRU5.

Likewise, in the example illustrated in FIG. 9, when the VUE is in V2P range with VRU2, VRU2 periodically performs a ranging operation 908 to the VUE, a ranging operation 904 to VRU1, a ranging operation 910 to VRU4, and a ranging operation 912 to VRU3, but does not perform a ranging operation to VRU5. VRU2 then reports the results of those ranging operations to the VUE.

Likewise, in the example illustrated in FIG. 9, when the VUE is in V2P range with VRU3, VRU3 periodically performs a ranging operation 914 to the VUE, a ranging operation 906 to VRU1, a ranging operation 912 to VRU2, and a ranging operation 916 to VRU5, but does not perform a ranging operation to VRU4. VRU3 then reports the results of those ranging operations to the VUE.

Each VRU may also provide its own GPS coordinates to the VUE as well. The VUE can then use these measurements and coordinates from the various VRUs to form a map of pedestrians around the VUE, e.g., using algorithms such as multidimensional scaling (with potentially missing entries), or triangulation methods, to improve on the location estimate of the pedestrian. Algorithms and triangulation methods work when each VRU shares a minimum number of ranging samples (e.g., 3 for triangulation). A VRU may benefit from sharing more ranging samples to help the VUE improve its location estimate, at the cost of additional battery consumption and additional signaling increase the congestion on the wireless medium.

In some aspects, a VUE can perform adaptive sampling, e.g., the VUE requests a VRU to share a specific amount of ranging samples, where the number of samples may depend on the VRU's battery level, the VRU level of danger (e.g., distance and relative velocity to the VUE or to a geographic area 918 associated with a hazard, such as a busy intersection or pedestrian crosswalk, etc.), density of pedestrians (e.g., other VRUs), or other metrics.

For example, a VUE may adapt the ranging request to a VRU to share a preconfigured amount of ranging measurements depending on the VRU's battery level. Likewise, the VRU may decide not to request a measurement from a specific VRU if that specific VRU has signaled that its battery level is less than a specified threshold. In another example, A VUE may request a VRU to perform ranging measurements to a default number of other VRUs if the requested VRU has a battery level above a first threshold, to perform ranging measurements to a number of other VRUs smaller than the default number if the requested VRU has a battery level below the first threshold and above a second threshold, and to perform no ranging measurements if the requested VRU has a battery level below the second threshold. If a specific VRU has a battery level below the second threshold, the VUE may signal other VRUs to performing ranging measurements to the specific VRU so that the specific VRU does not have to perform those operations and thus reduce the battery consumption of that specific VRU. In other words, the VUE leverages the symmetry property of ranging by requesting neighboring VRUs to provide ranging data about the VRU of interest.

In some aspects, the VUE requests each VRU to share ranging data with a preconfigured number/set of other VRUs in its vicinity, where the amount of requested ranging data by VUE depends on the density of other VRUs in the vicinity of the particular VRU to which the request is being sent. In some aspects, VRU density in the vicinity of a VRU defined as the number of distinct VRUs (as defined by VRU identifier) that a particular VRU can detect in an area (e.g., defined with the particular VRU's location as center and a preconfigured radius R meters). For example, if the VRU density is greater than a threshold density, VRU1 needs to report x unique ranging measurements, or y % of the sensed VRU density.

In some aspects, a VUE may additionally request a VRU to perform ranging with specific VRUs by providing a list of VRU identifiers, which may be, for example, VRUs that have a very accurate location estimate, allowing the VUE to propagate the strong location confidence to other VRUs.

In some aspects, each VRU may be preconfigured to periodically perform the ranging operation, or periodically perform the ranging operation in response to detection of a trigger condition. Examples of trigger conditions include, but are not limited to, receipt of a public service message (PSM) from a VUE or an RSU or detection that the VRU is in or near a specified geographic position or area (e.g., near a busy or dangerous intersection). In the latter case, the geographic position or area may be specified by a VUE or RSU, may be preconfigured to the VRU, or combinations thereof.

In some aspects, each VRU may perform the ranging operation upon reception of an explicit request to perform such an operation. This explicit request can be sent by a VUE, an RSU, or another VRU. The explicit request may include a list of VRUs for which ranging data is desired, e.g., the list of VRUs is decided by requesting entity, or the explicit request may specify a number of VRUs to be measured and the VRU receiving that request decides which VRUs to range. In some aspects, the list of VRUs may be selected randomly or by some selection algorithm, including, but not limited to, the selection algorithms described above. In some aspects, the selecting entity (VUE, VRU, or RSU) can select or avoid selecting specific VRUs based on selection criteria. Examples of selection criteria include, but are not limited to, selection of a VRU based on: a battery level of the VRU; a battery level of another VRU (e.g., leveraging the symmetry property as described above); a trajectory or anticipated trajectory of the VRU; a proximity or anticipated proximity of the VRU to a danger or hazard; a proximity or anticipated proximity of the VRU to another VRU; a level of confidence of a geographic location of the VRU; a capability of the VRU; a mobility status of the VRU; a number or relative density of PUEs in, or anticipated to be in, the vicinity of the VRU; or combinations thereof.

Figure 10:
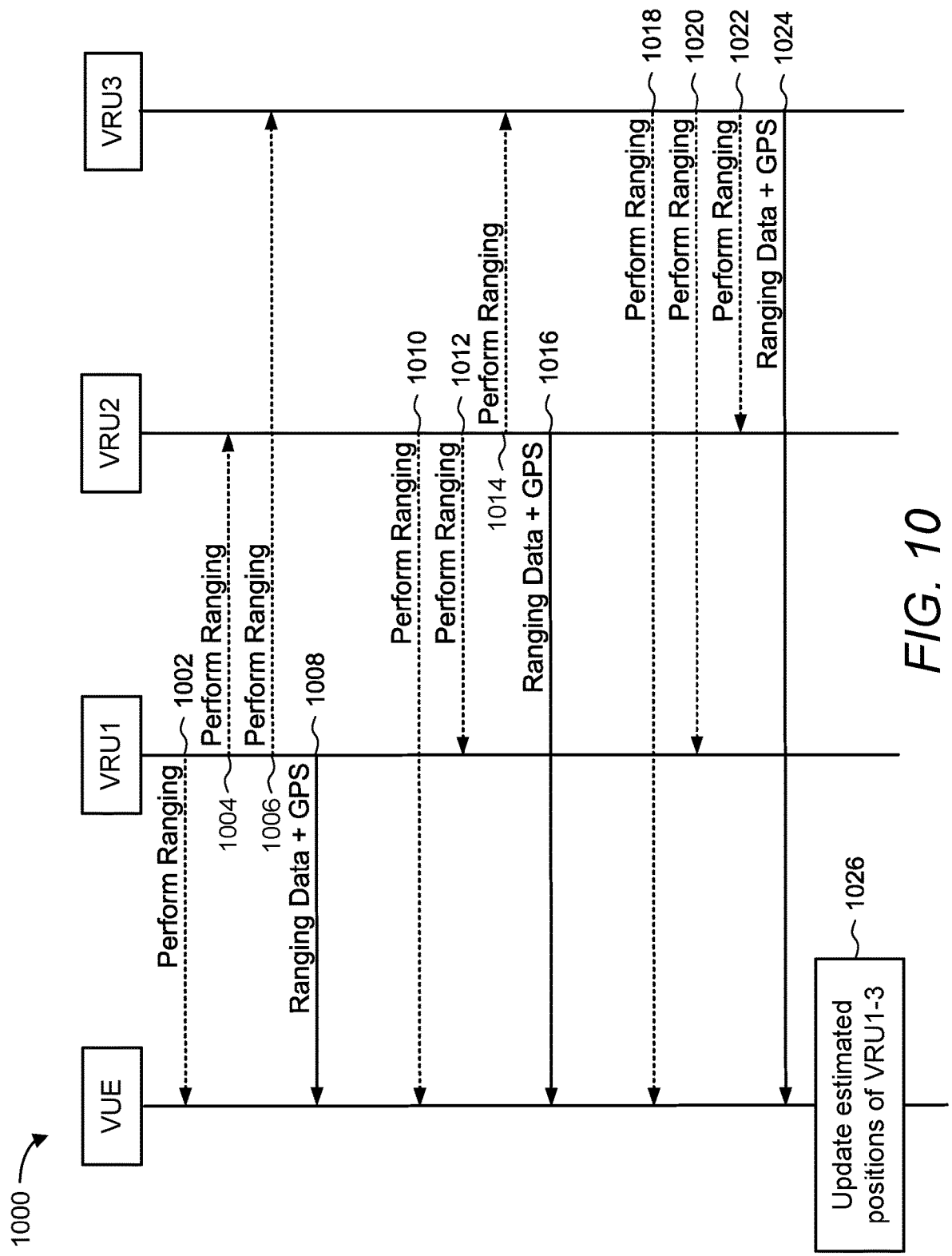

FIG. 10 illustrates a method 1000 for pedestrian localization according to some aspects of the disclosure. FIG. 10 illustrates an aspect in which a VRU may collect range information to a subset of VRUs in its vicinity and provide that information to a VUE along with range information from the VRU to the VUE. FIG. 10 shows example operations taken by the VUE and VRUs in FIG. 9, but the same concepts may be applied to other scenarios involving one or more VUEs and one or more VRUs. In the example shown in FIG. 10, VRU1 performs a ranging operation 1002 to the VUE, a ranging operation 1004 to VRU2, and a ranging operation 1006 to VRU3, then reports the ranging data, including its GPS location, to the VUE (signal 1008). The order of ranging operations shown in FIG. 10 are illustrative and not limiting. In the example shown in FIG. 10, VRU2 performs a ranging operation 1010 to the VUE, a ranging operation 1012 to VRU1, and a ranging operation 1014 to VRU3, then reports the ranging data, including its GPS location, to the VUE (signal 1016). In the example shown in FIG. 10, VRU3 performs a ranging operation 1018 to the VUE, a ranging operation 1020 to VRU1, and a ranging operation 1022 to VRU3, then reports the ranging data, including its GPS location, to the VUE (signal 1024). The VUE then uses the received ranging data to update the estimated positions of VRU1, VRU2, and VRU3 (block 1026). In the example illustrated in FIG. 10, the VUE updates the estimated positions after all data has been received, but alternatively, the VUE may update the estimated position of one or more of the VRUs every time it receives ranging data from any VRU, or according to some other algorithm. In some aspects, a VRU may perform the ranging operations in response to receiving a PSM from a VUE.

In some aspects, the VRU may choose whether or not to perform the ranging operations based on whether or not the VRU is currently moving. For example, a PUE possessed by a person not currently moving, e.g., someone eating at an outdoor cafe, may choose not to engage in ranging operations, e.g., because the likelihood that that person will be moving into the path of an oncoming vehicle is low. Likewise, a VRU, whether moving or not, that receives a PSM from a VUE that is currently not moving (e.g., a parked car), may decide not to perform ranging operations for that VUE. In some aspects, a VUE may notify VRUs of its approach, and instruct the VRUs to configure themselves so that, when and if the VRU approaches the curb, that VRU should transmit its position to the VUE more frequently.

Figure 11:
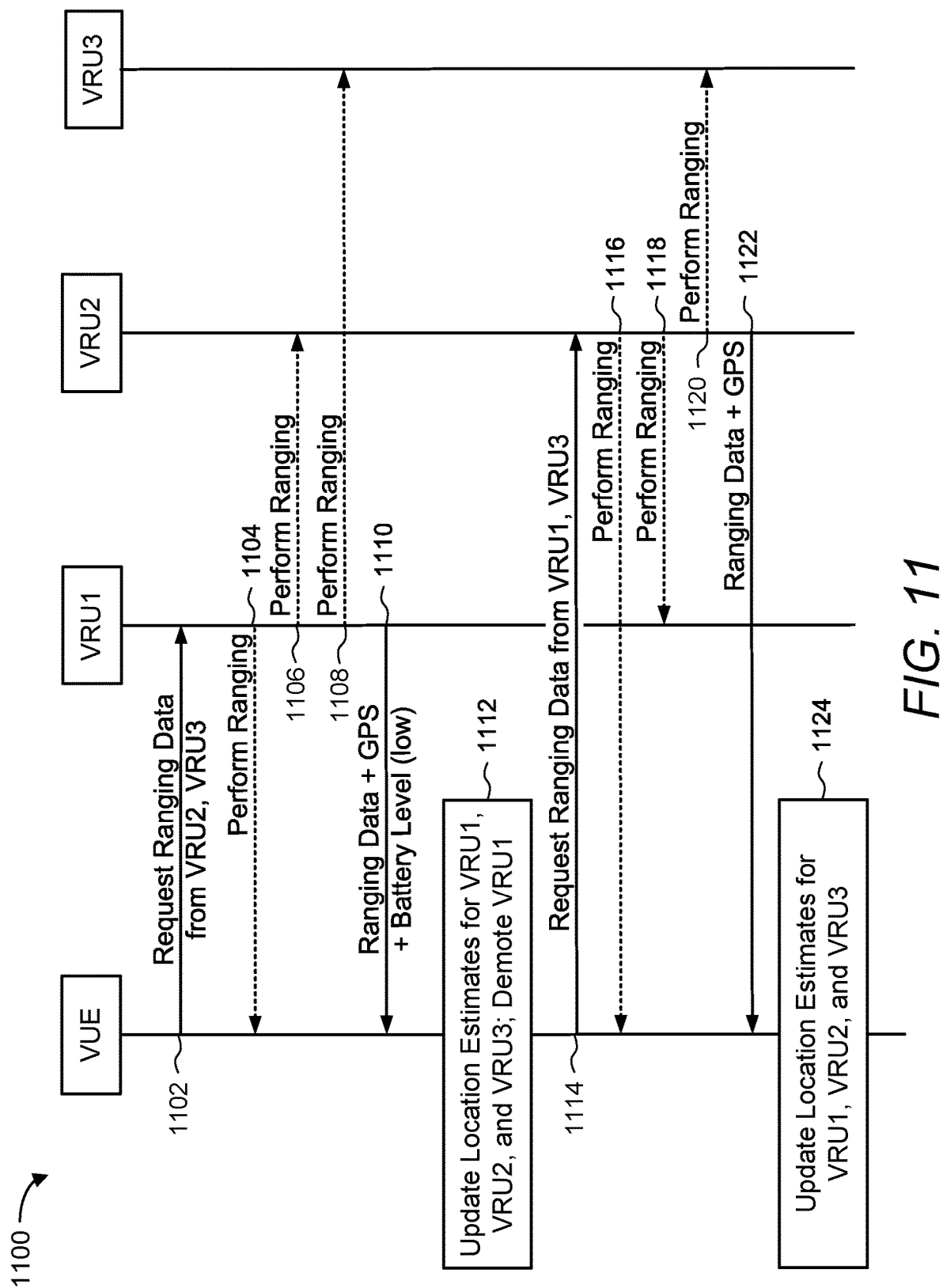

FIG. 11 illustrates a method 1100 for pedestrian localization according to some aspects of the disclosure. FIG. 11 illustrates an aspect in which a VRU may collect range information to a subset of VRUs in its vicinity and provide that information to a VUE along with range information from the VRU to the VUE. FIG. 11 shows example operations taken by the VUE and VRUs in FIG. 9, but the same concepts may be applied to other scenarios involving one or more VUEs and one or more VRUs. In the example shown in FIG. 11, the VUE sends, to VRU1, a request 1102 for ranging data from a specified set of VRUs, e.g., VRU2 and VRU3. VRU1 performs a ranging operation 1104 to the VUE, a ranging operation 1106 to VRU2, and a ranging operation 1108 to VRU3, then reports the ranging data, including its GPS location, to the VUE (signal 1110). The order of ranging operations shown in FIG. 11 are illustrative and not limiting. In the example shown in FIG. 11, VRU1 also sends to the VUE an indication of VRU1 battery level, which in this scenario is low. The VUE then updates its location estimates for VRU1, VRU2, and VRU3 (block 1112). Because VRU1's battery level is low, VUE demotes VRU1, i.e., removes VRU1 from consideration for receiving a request for ranging data. In the example illustrated in FIG. 11, the VUE then sends, to VRU2, a request 1114 for ranging data from a specified set of VRUs, e.g., VRU1 and VRU3. VRU2 performs a ranging operation 1116 to the VUE, a ranging operation 1118 to VRU1, and a ranging operation 1120 to VRU3, then reports the ranging data, including its GPS location, to the VUE (signal 1122). The VUE then uses the received ranging data to update the estimated positions of VRU1, VRU2, and VRU3 (block 1124).

Figure 12:
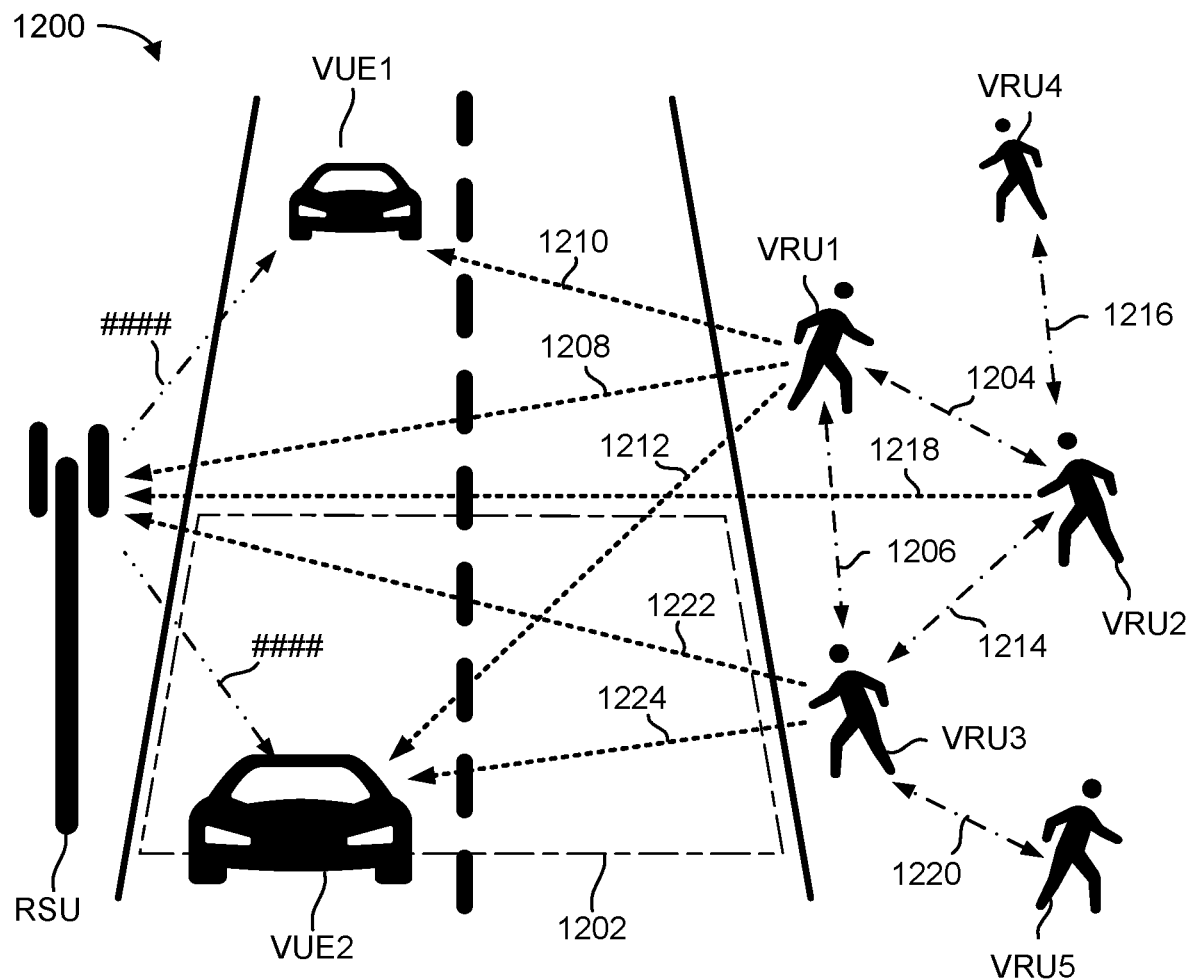

FIG. 12 illustrates a method 1200 for pedestrian localization according to some aspects of the disclosure. In the scenario illustrated in FIG. 12, pedestrians VRU1, VRU2, and VRU3 are in the vicinity of an RSU, as are VUE1 and VUE2. FIG. 12 illustrates an aspect in which a VRU may collect range information to a subset of VRUs in its vicinity and provide that information to an RSU along with range information from the VRU to the RSU. In this manner an RSU may collect range information to a subset of VRUs in its vicinity and provide that information to one or more VUEs. In some aspects, the RSU manages the selection of VRUs in its vicinity and interacts with VUEs as needed. This approach has the advantage that the RSU operates as a mediator or buffer between VUEs and VRUs, with the result that the each VRU may take instructions from one entity—the RSU—rather than from many entities—the one or more VUEs. In some aspects, an RSU may also use additional data, such as sensor data (e.g., images from a camera mounted to the RSU, for example) to identify VRUs that should participate in the ranging operations. In some aspects, an RSU may use sensor data to detect moving, non-PUE obstacles, such as animals, and notify a VUE or VRU of the presence and position of those obstacles. In some aspects, an RSU may be configured to detect radio collars, near-field communication (NFC) tags, or other devices that may be attached to a pet collar, leash, etc., and thereby detect pets and provide their locations to VUEs for assistance in collision avoidance.

In some aspects, an RSU may instruct a VRU to perform a range operation to one or more VUEs, but the VRU is not flooded with requests from every VUE in its vicinity. Instead, each VUE may coordinate with the RSU to get position estimates for VRUs in the vicinity of the particular VUE. Furthermore, because the RSU's location is static (unlike the VUEs), the RSU can take into account features of the environment in its vicinity, such as barriers, obstacles, and hazards, etc., when selecting VRUs for participation in ranging operations. For example, an RSU may detect that a VRU, e.g., VRU3 in FIG. 12, is in or is approaching a hazardous zone 1202, and in response instruct VRU3 to provide ranging information more frequently than other VRUs not in or near the hazardous zone 1202. In some aspects, the RSU or VUE may instruct a first VRU to perform and report ranging information for a second VRU that the first VRU determines is within, near, or heading toward the hazardous zone 1202 or in another zone specified by the RSU or VUE.

In some aspects, when a VRU comes in the RSU's PSM range, the VRU periodically measures the distance separating it to the RSU and to some VRUs around it, using e.g., TDoA technique, and sends the ranging data to the RSU. These measurements can be used by the RSU to form a map of pedestrians around it using algorithms such as Multidimensional Scaling (with potentially missing entries), or triangulation methods to improve on the location estimate of the pedestrian. The VRU needs to share its GPS coordinate as well, to be used as an anchor.

In FIG. 12, for example, when VRU1 is in pedestrian to infrastructure (P2I) range with the RSU, VRU1 may periodically perform a ranging operation 1204 to VRU2, and a ranging operation 1206 to VRU3, and report the results of those ranging operations to the RSU (signal 1208). VRU1 may also perform a ranging operation to the RSU and include that range data with the results. In some aspects, VRU1 may also perform a ranging operation to a VUE if instructed to do so by the RSU. In FIG. 12, for example, VRU1 may perform a ranging operation 1210 to VUE1 and a ranging operation 1212 to VUE2, but does not perform a ranging operation to VRU4 or VRU5.

Likewise, in the example illustrated in FIG. 12, when VRU2 is in P2I range with the RSU, VRU2 may periodically perform a ranging operation 1204 to VRU1, and a ranging operation 1214 to VRU3, and a ranging operation 1216 to VRU4, and report the results of those ranging operations to the RSU (signal 1218). VRU2 may also perform a ranging operation to the RSU and include that range data with the results.

Likewise, in the example illustrated in FIG. 12, when VRU3 is in P2I range with the RSU, VRU3 may periodically perform a ranging operation 1206 to VRU1, and a ranging operation 1214 to VRU2, and a ranging operation 1220 to VRU5, and report the results of those ranging operations to the RSU (signal 1222). VRU3 may also perform a ranging operation to the RSU and include that range data with the results. In some aspects, VRU3 may also perform a ranging operation to a VUE if instructed to do so by the RSU. In FIG. 12, for example, VRU3 may perform a ranging operation 1224 to VUE2.

Each VRU may also provide its own GPS coordinates to the RSU as well. The RSU can then use these measurements and coordinates from the various VRUs to form a map of pedestrians around the RSU, e.g., using algorithms such as multidimensional scaling (with potentially missing entries), or triangulation methods, to improve on the location estimate of the pedestrian. Algorithms and triangulation methods work when each VRU shares a minimum number of ranging samples (e.g., 3 for triangulation). A VRU may benefit from sharing more ranging samples to help the RSU improve its location estimate, at the cost of additional battery consumption and additional signaling increase the congestion on the wireless medium.

In some aspects, an RSU can perform adaptive sampling, e.g., the RSU requests a VRU to share a specific amount of ranging samples, where the number of samples may depend on the VRU's battery level, the VRU level of danger (e.g., distance and relative velocity to the RSU), density of pedestrians (e.g., other VRUs), or other metrics.

For example, an RSU may adapt the ranging request to a VRU to share a preconfigured amount of ranging measurements depending on the VRU's battery level. Likewise, the VRU may decide not to request a measurement from a specific VRU if that specific VRU has signaled that its battery level is less than a specified threshold. In another example, A RSU may request a VRU to perform ranging measurements to a default number of other VRUs if the requested VRU has a battery level above a first threshold, to perform ranging measurements to a number of other VRUs smaller than the default number if the requested VRU has a battery level below the first threshold and above a second threshold, and to perform no ranging measurements if the requested VRU has a battery level below the second threshold. If a specific VRU has a battery level below the second threshold, the RSU may signal other VRUs to performing ranging measurements to the specific VRU so that the specific VRU does not have to perform those operations and thus reduce the battery consumption of that specific VRU. In other words, the RSU leverages the symmetry property of ranging by requesting neighboring VRUs to provide ranging data about the VRU of interest.

In some aspects, the RSU requests each VRU to share ranging data with a preconfigured number/set of other VRUs in its vicinity, where the amount of requested ranging data by RSU depends on the density of other VRUs in the vicinity of the particular VRU to which the request is being sent. In some aspects, VRU density in the vicinity of a VRU defined as the number of distinct VRUs (as defined by VRU identifier) that a particular VRU can detect in an area (e.g., defined with the particular VRU's location as center and a preconfigured radius R meters). For example, if the VRU density is greater than a threshold density, VRU1 needs to report x unique ranging measurements, or y % of the sensed VRU density.

In some aspects, an RSU may additionally request a VRU to perform ranging with specific VRUs by providing a list of VRU identifiers, which may be, for example, VRUs that have a very accurate location estimate, allowing the RSU to propagate the strong location confidence to other VRUs.

In some aspects, each VRU may be preconfigured to periodically perform the ranging operation, or periodically perform the ranging operation in response to detection of a trigger condition. Examples of trigger conditions include, but are not limited to, receipt of a public service message (PSM) from an RSU or an RSU or detection that the VRU is in or near a specified geographic position or area (e.g., near a busy or dangerous intersection). In the latter case, the geographic position or area may be specified by a VUE or RSU, may be preconfigured to the VRU, or combinations thereof.

In some aspects, each VRU may perform the ranging operation upon reception of an explicit request to perform such an operation. This explicit request can be sent by an RSU, a VUE, or another VRU. The explicit request may include a list of VRUs for which ranging data is desired, e.g., the list of VRUs is decided by requesting entity, or the explicit request may specify a number of VRUs to be measured and the VRU receiving that request decides which VRUs to range. In some aspects, the list of VRUs may be selected randomly or by some selection algorithm, including, but not limited to, the selection algorithms described above. In some aspects, the selecting entity (VUE, VRU, or RSU) can select or avoid selecting specific VRUs based on selection criteria. Examples of selection criteria include, but are not limited to, selection of a VRU based on: a battery level of the VRU; a battery level of another VRU (e.g., leveraging the symmetry property as described above); a trajectory or anticipated trajectory of the VRU; a proximity or anticipated proximity of the VRU to a danger or hazard; a proximity or anticipated proximity of the VRU to another VRU; a level of confidence of a geographic location of the VRU; a capability of the VRU; a mobility status of the VRU; a number or relative density of PUEs in, or anticipated to be in, the vicinity of the VRU; or combinations thereof.

Figure 13:
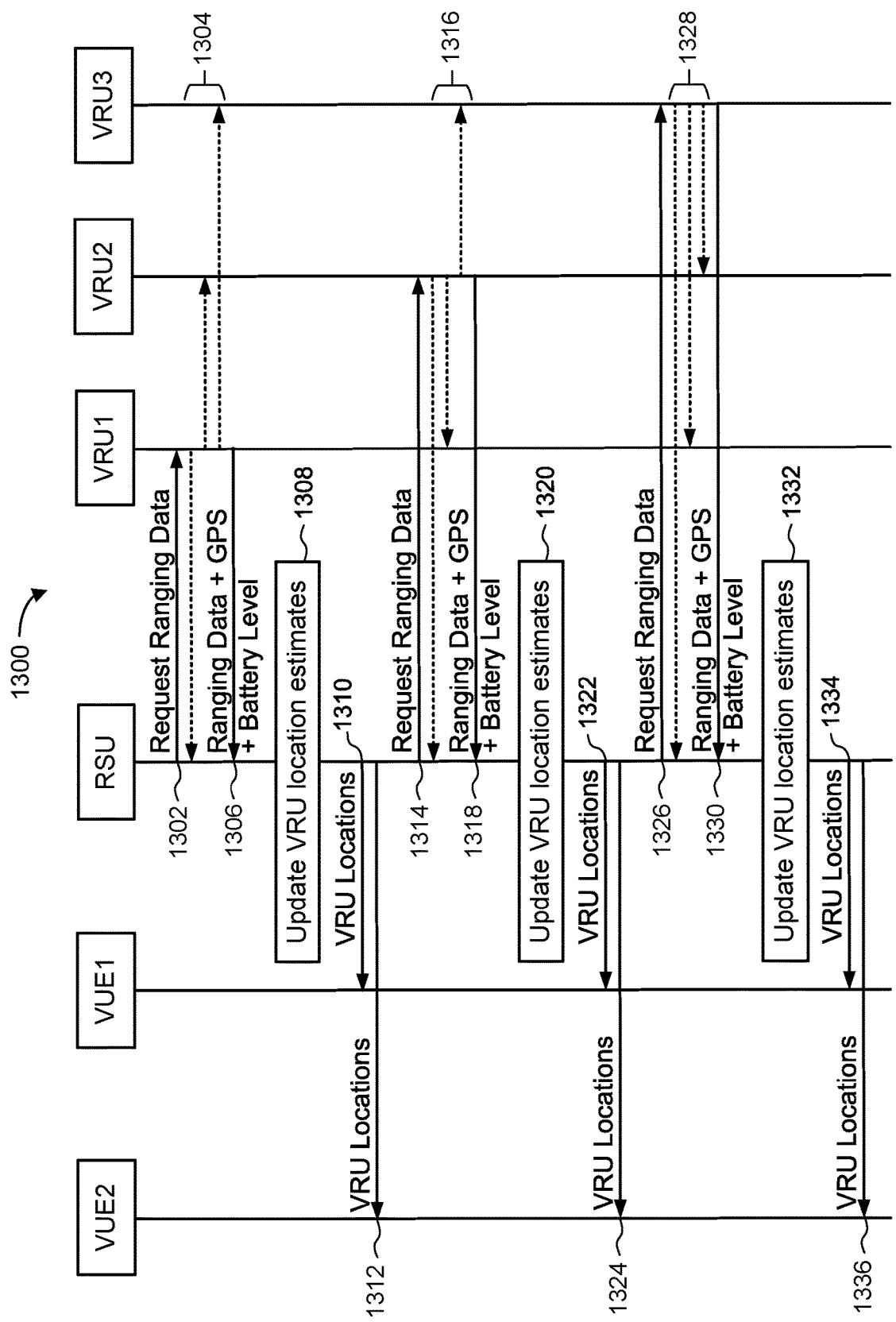

FIG. 13 illustrates a method 1300 for pedestrian localization according to some aspects of the disclosure. FIG. 13 illustrates an aspect in which a VRU may collect range information to a subset of VRUs in its vicinity and provide that information to an RSU, which can then update VRU location estimates and optionally provide those estimates to VUEs. FIG. 13 shows example operations taken by RSU, VRUs, and VUEs shown in the example illustrated in FIG. 12, but the same concepts may be applied to other scenarios involving different numbers of RSUs, VRUs, and VUEs. In the example shown in FIG. 13, the RSU sends, to VRU1, a request 1302 for ranging data. In response, VRU1 performs a set of ranging operations 1304, and sends ranging data 1306 to the RSU. In some aspects, the ranging data includes GPS or other location information for VRU1 as well as VRU1's battery level. The RSU updates VRU location estimates (block 1308) and sends the updated VRU locations to VUE1 (signal 1310) and VUE2 (signal 1312). In the example shown in FIG. 13, the RSU sends, to VRU2, a request 1314 for ranging data. In response, VRU2 performs a set of ranging operations 1316, and sends ranging data 1318 to the RSU. In some aspects, the ranging data includes GPS or other location information for VRU2 as well as VRU2's battery level. The RSU updates VRU location estimates (block 1320) and sends the updated VRU locations to VUE1 (signal 1322) and VUE2 (signal 1324). In the example shown in FIG. 13, the RSU sends, to VRU3, a request 1326 for ranging data. In response, VRU3 performs a set of ranging operations 1328, and sends ranging data 1330 to the RSU. In some aspects, the ranging data includes GPS or other location information for VRU3 as well as VRU3's battery level. The RSU updates VRU location estimates (block 1332) and sends the updated VRU locations to VUE1 (signal 1334) and VUE2 (signal 1336).

Figure 14:
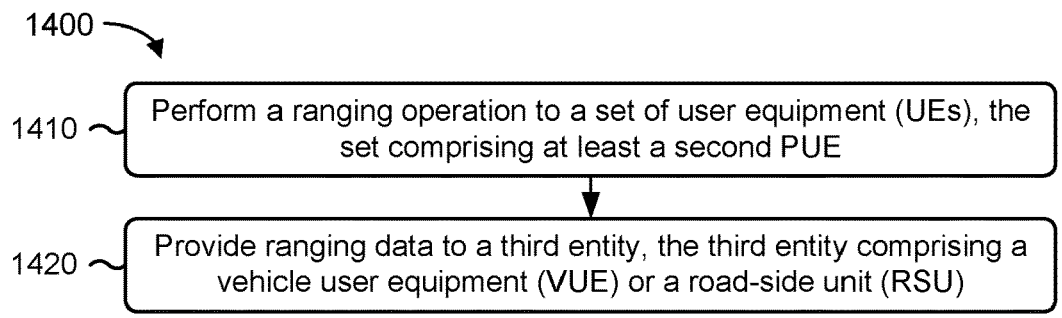

FIG. 14 is a flowchart of an example process 1400 associated with ranging assisted pedestrian localization. In some aspects, one or more process blocks of FIG. 14 may be performed by a pedestrian user equipment (PUE) (e.g., UE 400). In some aspects, one or more process blocks of FIG. 14 may be performed by another device or a group of devices separate from or including the pedestrian user equipment (PUE). Additionally, or alternatively, one or more process blocks of FIG. 14 may be performed by one or more components of device 400, such as processing system 410, memory 414, transceiver 404, sensors 408, sidelink manager 424, user interface 416, etc.

As shown in FIG. 14, process 1400 may include performing a ranging operation to a set of user equipment (UEs), the set comprising at least a second PUE (block 1410). For example, the PUE may perform a ranging operation to a set of user equipment (UEs), the set comprising at least a second PUE, as described above.

As further shown in FIG. 14, process 1400 may include providing ranging data to a third entity, the third entity comprising a vehicle user equipment (VUE) or a road-side unit (RSU) (block 1420). For example, the PUE may provide ranging data to a third entity, the third entity comprising a vehicle user equipment (VUE) or a road-side unit (RSU), as described above. In some aspects, the ranging data comprises location information, the location information identifying a location of the first PUE, a location of at least one of the set of UEs, or combinations thereof. In some aspects, the location information comprises global positioning system (GPS) information. In some aspects, the third entity is a member of the set of UEs.

In some aspects, the ranging operation to the set of UEs is performed periodically. In some aspects, the ranging operation to the set of UEs is performed in response to detecting a trigger condition. In some aspects, detecting the trigger condition comprises detecting that the first PUE is within, or within a threshold distance from, a predetermined geographic area. In some aspects, the predetermined geographic area is specified by the third entity. In some aspects, detecting the trigger condition comprises receiving a request to perform the ranging operation. In some aspects, the request to perform the ranging operation is received from the third entity, from the second PUE, or from a third PUE.

In some aspects, the set of UEs is selected by the first PUE. In some aspects, the set of UEs is selected by the third entity and wherein the request to perform the ranging operation comprises information identifying the set of other UEs. In some aspects, at least one member of the set of UEs is selected based on a battery level of the one member, a battery level of another member of the set of UEs, a trajectory or anticipated trajectory of the one member, a proximity or anticipated proximity of the one member to a danger or hazard, a proximity or anticipated proximity of the one member to another member of the set of UEs, a level of confidence of a geographic location of the one member, a capability of the one member, a mobility status of the one member, a number or relative density of PUEs in, or anticipated to be in, the vicinity of the one member, or combinations thereof.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
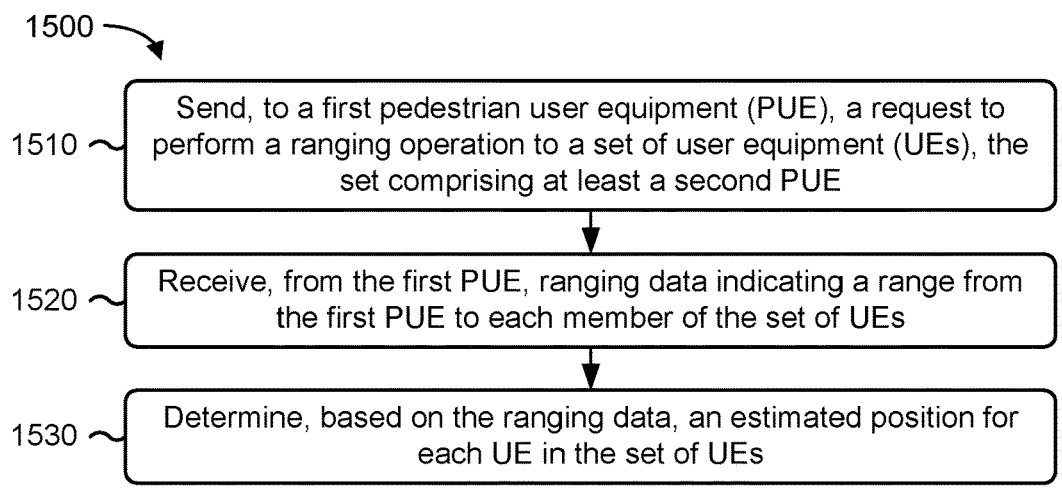

FIG. 15 is a flowchart of an example process 1500 associated with ranging assisted pedestrian localization. In some aspects, one or more process blocks of FIG. 15 may be performed by a vehicle user equipment (VUE) (e.g., UE 400). In some aspects, one or more process blocks of FIG. 15 may be performed by another device or a group of devices separate from or including the vehicle user equipment (VUE). Additionally, or alternatively, one or more process blocks of FIG. 15 may be performed by one or more components of device 400, such as processing system 410, memory 414, transceiver 404, sensors 408, sidelink manager 424, user interface 416, etc.

As shown in FIG. 15, process 1500 may include sending, to a first pedestrian user equipment (PUE), a request to perform a ranging operation to a set of user equipment (UEs), the set comprising at least a second PUE (block 1510). For example, the VUE may send, to a first pedestrian user equipment (PUE), a request to perform a ranging operation to a set of user equipment (UEs), the set comprising at least a second PUE, as described above.

As further shown in FIG. 15, process 1500 may include receiving, from the first PUE, ranging data indicating a range from the first PUE to each member of the set of UEs (block 1520). For example, the VUE may receive, from the first PUE, ranging data indicating a range from the first PUE to each member of the set of UEs, as described above.

As further shown in FIG. 15, process 1500 may include determining, based on the ranging data, an estimated position for each UE in the set of UEs (block 1530). For example, the VUE may determine, based on the ranging data, an estimated position for each UE in the set of UEs, as described above. In some aspects, the ranging data comprises location information, the location information identifying a location of the first PUE, a location of at least one of the set of UEs, or combinations thereof. In some aspects, the location information comprises global positioning system (GPS) information. In some aspects, the ranging data further indicates a range from the first PUE to the VUE.

In some aspects, requesting indicates that the ranging operation to the set of UEs is to be performed periodically. In some aspects, the request identifies a trigger condition upon detection of which the ranging operation is to be performed. In some aspects, the trigger condition comprises detecting that the first PUE is within, or within a threshold distance from, a predetermined geographic area. In some aspects, the predetermined geographic area is specified by the VUE or by a third entity.

In some aspects, the set of UEs is selected by the first PUE. In some aspects, the set of UEs is selected by the VUE and wherein the request to perform the ranging operation comprises information identifying the set of UEs. In some aspects, at least one member of the set of UEs is selected based on a battery level of the one member, a battery level of another member of the set of UEs, a trajectory or anticipated trajectory of the one member, a proximity or anticipated proximity of the one member to a danger or hazard, a proximity or anticipated proximity of the one member to another member of the set of UEs, a level of confidence of a geographic location of the one member, a capability of the one member, a mobility status of the one member, a number or relative density of PUEs in, or anticipated to be in, the vicinity of the one member, or combinations thereof.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
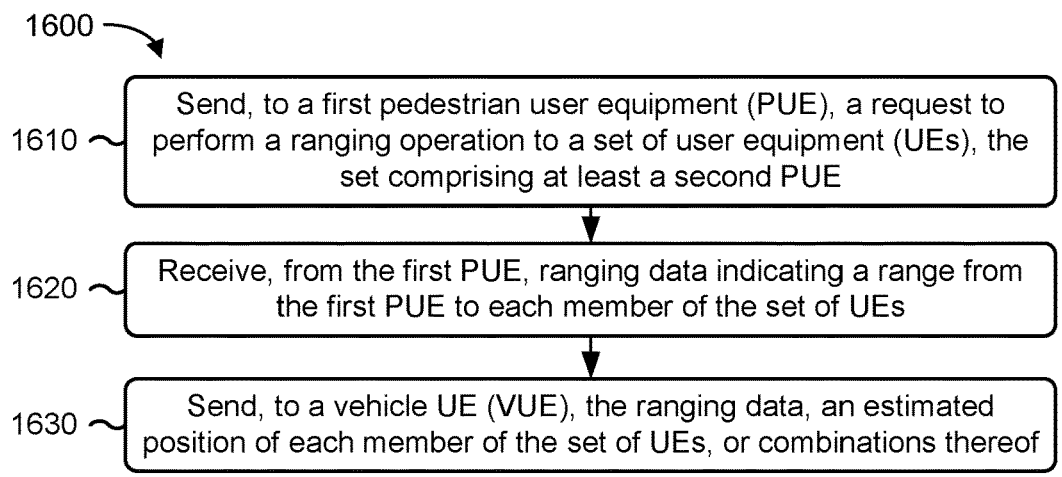

FIG. 16 is a flowchart of an example process 1600 associated with ranging assisted pedestrian localization. In some aspects, one or more process blocks of FIG. 16 may be performed by a road-side unit (RSU) (e.g., RSU 426). In some aspects, one or more process blocks of FIG. 16 may be performed by another device or a group of devices separate from or including the road-side unit (RSU). Additionally, or alternatively, one or more process blocks of FIG. 16 may be performed by one or more components of RSU 426, such as processing system 410, memory 414, transceiver 404, sensors 408, sidelink manager 424, etc.

As shown in FIG. 16, process 1600 may include sending, to a first pedestrian user equipment (PUE), a request to perform a ranging operation to a set of user equipment (UEs), the set comprising at least a second PUE (block 1610). For example, the road-side unit (RSU) may send, to a first pedestrian user equipment (PUE), a request to perform a ranging operation to a set of user equipment (UEs), the set comprising at least a second PUE, as described above. In some aspects, the request indicates that the ranging operation to the set of UEs is to be performed periodically. In some aspects, the request identifies a trigger condition upon detection of which the ranging operation is to be performed. In some aspects, the trigger condition comprises detecting that the first PUE is within, or within a threshold distance from, a predetermined geographic area. In some aspects, the predetermined geographic area is specified by the RSU, by the VUE, or by a third entity.

In some aspects, the set of UEs is selected by the first PUE. In some aspects, the set of UEs is selected by the RSU or by the VUE and wherein the request to perform the ranging operation comprises information identifying the set of UEs. In some aspects, at least one member of the set of UEs is selected based on a battery level of the one member, a battery level of another member of the set of UEs a trajectory or anticipated trajectory of the one member, a proximity or anticipated proximity of the one member to a danger or hazard, a proximity or anticipated proximity of the one member to another member of the set of UEs, a level of confidence of a geographic location of the one member, a capability of the one member, a mobility status of the one member, a number or relative density of PUEs in, or anticipated to be in, the vicinity of the one member, or combinations thereof.

As further shown in FIG. 16, process 1600 may include receiving, from the first PUE, ranging data indicating a range from the first PUE to each member of the set of UEs (block 1620). For example, the road-side unit (RSU) may receive, from the first PUE, ranging data indicating a range from the first PUE to each member of the set of UEs, as described above. In some aspects, the ranging data comprises location information, the location information identifying a location of the first PUE, a location of at least one of the set of UEs, or combinations thereof. In some aspects, the location information comprises global positioning system (GPS) information. In some aspects, the ranging information further indicates a range from the first PUE to the RSU.

As further shown in FIG. 16, process 1600 may include sending, to a vehicle UE (VUE), the ranging data, an estimated position of each member of the set of UEs, or combinations thereof (block 1630). For example, the road-side unit (RSU) may send, to a vehicle UE (VUE), the ranging data, an estimated position of each member of the set of UEs, or combinations thereof, as described above.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
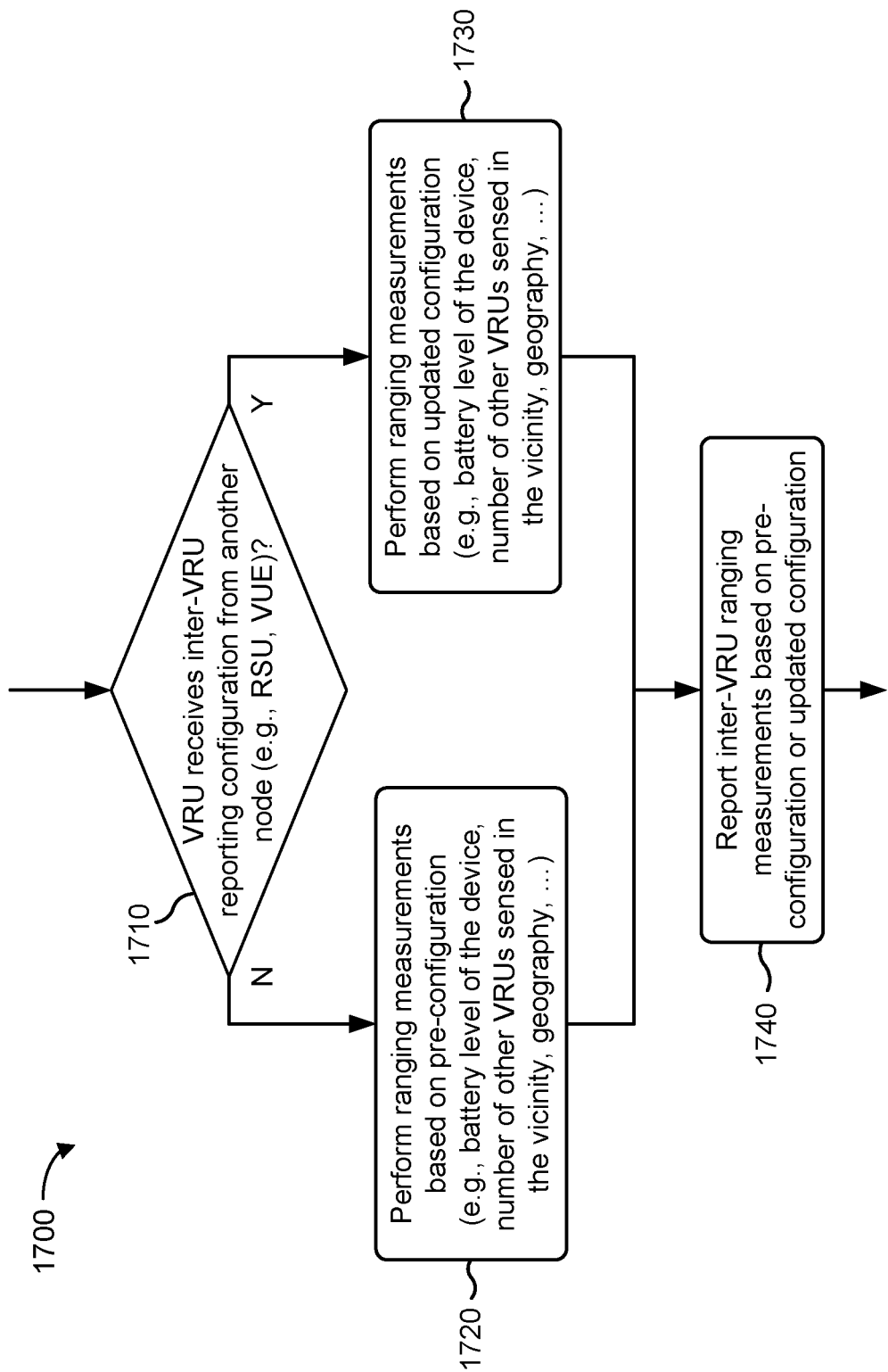

FIG. 17 is a flowchart of an example process 1700 associated with ranging assisted pedestrian localization. In some aspects, one or more process blocks of FIG. 17 may be performed by a vulnerable road user (e.g., any of the VRUs or PUEs described herein). In some aspects, one or more process blocks of FIG. 17 may be performed by one or more components of device 400, such as processing system 410, memory 414, transceiver 404, sensors 408, sidelink manager 424, user interface 416, etc.

As shown in FIG. 17, process 1700 may include, at block 1710, determining whether a VRU has received an inter-VRU reporting configuration from another node, e.g., from an RSU or VUE. If not, then the process 1700 moves to block 1720, and if so, then the process 1700 moves to block 1730. At block 1720, the process 1700 includes performing ranging measurements based on a pre-configuration, and at block 1730, the process 1700 includes performing measurements based on an updated configuration. A pre-configuration or updated configuration may consider a number of factors to determine how many and which ranging measurements should be performed. Examples of factors include, but are not limited to, the battery level of the device, the number of other VRUs sensed in the vicinity of the device, and the geography in the vicinity of the device.

As shown in FIG. 17, process 1700 may further include, at block 1740, reporting the inter-VRU ranging measurements taken based on the pre-configuration or the updated configuration.

Although FIG. 17 shows example blocks of process 1700, in some aspects, process 1700 may include additional blocks, fewer blocks, different blocks, or differently arranged blocks than those depicted in FIG. 17.

Some of all of the techniques described herein may be used to dynamically modify the communication between VUEs, VRUs, and RSUs in response to changing conditions to concentrate communication on VRUs that are in danger or likely to have a potential collision.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Aspect examples are described in the following numbered clauses:

Clause 1. A method of wireless communication performed by a first pedestrian user equipment (PUE), the method comprising: performing a ranging operation to a set of user equipment (UEs), the set comprising at least a second PUE; and providing ranging data to a third entity, the third entity comprising a vehicle user equipment (VUE) or a road-side unit (RSU).

Clause 2. The method of clause 1, where the ranging data comprises location information, the location information identifying a location of the first PUE, a location of at least one of the set of UEs, or combinations thereof.

Clause 3. The method of clause 2, wherein the location information comprises global positioning system (GPS) information.

Clause 4. The method of any of clauses 1 to 3, wherein the third entity is a member of the set of UEs.

Clause 5. The method of any of clauses 1 to 4, wherein the ranging operation to the set of UEs is performed periodically.

Clause 6. The method of any of clauses 1 to 5, wherein the ranging operation to the set of UEs is performed in response to detecting a trigger condition.

Clause 7. The method of clause 6, wherein detecting the trigger condition comprises detecting that the first PUE is within, or within a threshold distance from, a predetermined geographic area.

Clause 8. The method of clause 7, wherein the predetermined geographic area is specified by the third entity.

Clause 9. The method of any of clauses 6 to 8, wherein detecting the trigger condition comprises receiving a request to perform the ranging operation.

Clause 10. The method of clause 9, wherein the request to perform the ranging operation is received from the third entity, from the second PUE, or from a third PUE.

Clause 11. The method of any of clauses 9 to 10, wherein the set of UEs is selected by the third entity and wherein the request to perform the ranging operation comprises information identifying the set of UEs.

Clause 12. The method of any of clauses 1 to 11, wherein the set of UEs is selected by the first PUE.

Clause 13. The method of any of clauses 1 to 12, wherein at least one member of the set of UEs is selected based on: a battery level of the at least one member; a battery level of another member of the set of UEs; a trajectory or anticipated trajectory of the one member; a proximity or anticipated proximity of the one member to a danger or hazard; a proximity or anticipated proximity of the one member to another member of the set of UEs; a level of confidence of a geographic location of the one member; a capability of the one member; a mobility status of the one member; or combinations thereof.

Clause 14. The method of any of clauses 1 to 13, wherein the number of UEs in the set of UEs is based on a number or relative density of PUEs in, or anticipated to be in, a vicinity of the first PUE.

Clause 15. The method of clause 14, wherein the vicinity of the first PUE comprises an area having the first PUE as center and a preconfigured radius.

Clause 16. The method of any of clauses 14 to 15, wherein the number of UEs in the set of UEs is calculated as a preconfigured number of PUEs in the vicinity of the first PUE or a preconfigured percentage of the density of PUEs in the vicinity of the first PUE.

Clause 17. The method of clause 16, wherein the preconfigured number or the preconfigured percentage is selected based on one or more density thresholds of the density of PUEs in the vicinity of the first PUE.

Clause 18. A method of wireless communication performed by a vehicle user equipment (VUE), the method comprising: sending, to a first pedestrian user equipment (PUE), a request to perform a ranging operation to a set of user equipment (UEs), the set comprising at least a second PUE; receiving, from the first PUE, ranging data indicating a range from the first PUE to each member of the set of UEs; and determining, based on the ranging data, an estimated position for each UE in the set of UEs.

Clause 19. The method of clause 18, where the ranging data comprises location information, the location information identifying a location of the first PUE, a location of at least one of the set of UEs, or combinations thereof.

Clause 20. The method of clause 19, wherein the location information comprises global positioning system (GPS) information.

Clause 21. The method of any of clauses 18 to 20, wherein the ranging data further indicates a range from the first PUE to the VUE.

Clause 22. The method of any of clauses 18 to 21, wherein the request indicates that the ranging operation to the set of UEs is to be performed periodically.

Clause 23. The method of any of clauses 18 to 22, wherein the request identifies a trigger condition upon detection of which the ranging operation is to be performed.

Clause 24. The method of clause 23, wherein the trigger condition comprises detecting that the first PUE is within, or within a threshold distance from, a predetermined geographic area.

Clause 25. The method of clause 24, wherein the predetermined geographic area is specified by the VUE or by a third entity.

Clause 26. The method of any of clauses 18 to 25, wherein the set of UEs is selected by the VUE and wherein the request to perform the ranging operation comprises information identifying the set of UEs.

Clause 27. The method of any of clauses 18 to 26, wherein the set of UEs is selected by the first PUE.

Clause 28. The method of any of clauses 18 to 27, wherein at least one member of the set of UEs is selected based on: a battery level of the at least one member; a battery level of another member of the set of UEs; a trajectory or anticipated trajectory of the one member; a proximity or anticipated proximity of the one member to a danger or hazard; a proximity or anticipated proximity of the one member to another member of the set of UEs; a level of confidence of a geographic location of the one member; a capability of the one member; a mobility status of the one member; or combinations thereof.

Clause 29. The method of any of clauses 18 to 28, wherein the number of UEs in the set of UEs is based on a number or relative density of PUEs in, or anticipated to be in, a vicinity of the first PUE.

Clause 30. The method of clause 29, wherein the vicinity of the first PUE comprises an area having the first PUE as center and a preconfigured radius.

Clause 31. The method of any of clauses 29 to 30, wherein the number of UEs in the set of UEs is calculated as a preconfigured number of PUEs in the vicinity of the first PUE or a preconfigured percentage of the density of PUEs in the vicinity of the first PUE.

Clause 32. The method of clause 31, wherein the preconfigured number or the preconfigured percentage is selected based on one or more density thresholds of the density of PUEs in the vicinity of the first PUE.

Clause 33. A method of wireless communication performed by a road-side unit (RSU), the method comprising: sending, to a first pedestrian user equipment (PUE), a request to perform a ranging operation to a set of user equipment (UEs), the set comprising at least a second PUE; receiving, from the first PUE, ranging data indicating a range from the first PUE to each member of the set of UEs; and sending, to a vehicle UE (VUE), the ranging data, an estimated position of each member of the set of UEs, or combinations thereof.

Clause 34. The method of clause 33, where the ranging data comprises location information, the location information identifying a location of the first PUE, a location of at least one of the set of UEs, or combinations thereof.

Clause 35. The method of clause 34, wherein the location information comprises global positioning system (GPS) information.

Clause 36. The method of any of clauses 33 to 35, wherein the ranging data further indicates a range from the first PUE to the RSU.

Clause 37. The method of any of clauses 33 to 36, wherein the request indicates that the ranging operation to the set of UEs is to be performed periodically.

Clause 38. The method of any of clauses 33 to 37, wherein the request identifies a trigger condition upon detection of which the ranging operation is to be performed.

Clause 39. The method of clause 38, wherein the trigger condition comprises detecting that the first PUE is within, or within a threshold distance from, a predetermined geographic area.

Clause 40. The method of clause 39, wherein the predetermined geographic area is specified by the RSU, by the VUE, or by a third entity.

Clause 41. The method of any of clauses 33 to 40, wherein the set of UEs is selected by the first PUE.

Clause 42. The method of any of clauses 33 to 41, wherein the set of UEs is selected by the RSU or by the VUE and wherein the request to perform the ranging operation comprises information identifying the set of UEs.

Clause 43. The method of any of clauses 33 to 42, wherein at least one member of the set of UEs is selected based on: a battery level of the at least one member; a battery level of another member of the set of UEs a trajectory or anticipated trajectory of the one member; a proximity or anticipated proximity of the one member to a danger or hazard; a proximity or anticipated proximity of the one member to another member of the set of UEs; a level of confidence of a geographic location of the one member; a capability of the one member; a mobility status of the one member; a number or relative density of PUEs in, or anticipated to be in, a vicinity of the one member; or combinations thereof.

Clause 44. The method of any of clauses 33 to 43, wherein the number of UEs in the set of UEs is based on a number or relative density of PUEs in, or anticipated to be in, a vicinity of the first PUE.

Clause 45. The method of clause 44, wherein the vicinity of the first PUE comprises an area having the first PUE as center and a preconfigured radius.

Clause 46. The method of any of clauses 44 to 45, wherein the number of UEs in the set of UEs is calculated as a preconfigured number of PUEs in the vicinity of the first PUE or a preconfigured percentage of the density of PUEs in the vicinity of the first PUE.

Clause 47. The method of clause 46, wherein the preconfigured number or the preconfigured percentage is selected based on one or more density thresholds of the density of PUEs in the vicinity of the first PUE.

Clause 48. An apparatus comprising a memory and at least one processor communicatively coupled to the memory, the memory and the at least one processor configured to perform a method according to any of clauses 1 to 47.

Clause 49. An apparatus comprising means for performing a method according to any of clauses 1 to 47.

Clause 50. A non-transitory computer-readable medium storing computer-executable instructions, the computer-executable comprising at least one instruction for causing a computer or processor to perform a method according to any of clauses 1 to 47.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Other aspects are presented below. These aspects are illustrative and not limiting.

In an aspect, a method of wireless communication performed by a first pedestrian user equipment (PUE) includes performing a ranging operation to a set of user equipment (UEs), the set comprising at least a second PUE; and providing ranging data to a third entity, the third entity comprising a vehicle user equipment (VUE) or a road-side unit (RSU).

In some aspects, where the ranging data comprises location information, the location information identifying a location of the first PUE, a location of at least one of the set of UEs, or combinations thereof.

In some aspects, the location information comprises global positioning system (GPS) information.

In some aspects, the third entity is a member of the set of UEs.

In some aspects, the ranging operation to the set of UEs is performed periodically.

In some aspects, the ranging operation to the set of UEs is performed in response to detecting a trigger condition.

In some aspects, detecting the trigger condition comprises detecting that the first PUE is within, or within a threshold distance from, a predetermined geographic area.

In some aspects, the predetermined geographic area is specified by the third entity.

In some aspects, detecting the trigger condition comprises receiving a request to perform the ranging operation.

In some aspects, the request to perform the ranging operation is received from the third entity, from the second PUE, or from a third PUE.

In some aspects, the set of UEs is selected by the third entity and the request to perform the ranging operation comprises information identifying the set of UEs.

In some aspects, the set of UEs is selected by the first PUE.

In some aspects, at least one member of the set of UEs is selected based on: a battery level of the at least one member; a battery level of another member of the set of UEs; a trajectory or anticipated trajectory of the one member; a proximity or anticipated proximity of the one member to a danger or hazard; a proximity or anticipated proximity of the one member to another member of the set of UEs; a level of confidence of a geographic location of the one member; a capability of the one member; a mobility status of the one member; or combinations thereof.

In some aspects, a number of UEs in the set of UEs is based on a number or relative density of PUEs in, or anticipated to be in, a vicinity of the first PUE.

In some aspects, the vicinity of the first PUE comprises an area having the first PUE as center and a preconfigured radius.

In some aspects, the number of UEs in the set of UEs is calculated as a preconfigured number of PUEs in the vicinity of the first PUE or a preconfigured percentage of the density of PUEs in the vicinity of the first PUE.

In some aspects, the preconfigured number or the preconfigured percentage is selected based on one or more density thresholds of the density of PUEs in the vicinity of the first PUE.

In an aspect, a method of wireless communication performed by a vehicle user equipment (VUE) includes sending, to a first pedestrian user equipment (PUE), a request to perform a ranging operation to a set of user equipment (UEs), the set comprising at least a second PUE; receiving, from the first PUE, ranging data indicating a range from the first PUE to each member of the set of UEs; and determining, based on the ranging data, an estimated position for each UE in the set of UEs.

In some aspects, where the ranging data comprises location information, the location information identifying a location of the first PUE, a location of at least one of the set of UEs, or combinations thereof.

In some aspects, the location information comprises global positioning system (GPS) information.

In some aspects, the ranging data further indicates a range from the first PUE to the VUE.

In some aspects, the request indicates that the ranging operation to the set of UEs is to be performed periodically.

In some aspects, the request identifies a trigger condition upon detection of which the ranging operation is to be performed.

In some aspects, the trigger condition comprises detecting that the first PUE is within, or within a threshold distance from, a predetermined geographic area.

In some aspects, the predetermined geographic area is specified by the VUE or by a third entity.

In some aspects, the set of UEs is selected by the VUE and the request to perform the ranging operation comprises information identifying the set of UEs.

In some aspects, the set of UEs is selected by the first PUE.

In some aspects, at least one member of the set of UEs is selected based on: a battery level of the at least one member; a battery level of another member of the set of UEs; a trajectory or anticipated trajectory of the one member; a proximity or anticipated proximity of the one member to a danger or hazard; a proximity or anticipated proximity of the one member to another member of the set of UEs; a level of confidence of a geographic location of the one member; a capability of the one member; a mobility status of the one member; or combinations thereof.

In some aspects, a number of UEs in the set of UEs is based on a number or relative density of PUEs in, or anticipated to be in, a vicinity of the first PUE.

In some aspects, the vicinity of the first PUE comprises an area having the first PUE as center and a preconfigured radius.

In some aspects, the number of UEs in the set of UEs is calculated as a preconfigured number of PUEs in the vicinity of the first PUE or a preconfigured percentage of the density of PUEs in the vicinity of the first PUE.

In some aspects, the preconfigured number or the preconfigured percentage is selected based on one or more density thresholds of the density of PUEs in the vicinity of the first PUE.

In an aspect, a method of wireless communication performed by a road-side unit (RSU) includes sending, to a first pedestrian user equipment (PUE), a request to perform a ranging operation to a set of user equipment (UEs), the set comprising at least a second PUE; receiving, from the first PUE, ranging data indicating a range from the first PUE to each member of the set of UEs; and sending, to a vehicle UE (VUE), the ranging data, an estimated position of each member of the set of UEs, or combinations thereof.

In some aspects, where the ranging data comprises location information, the location information identifying a location of the first PUE, a location of at least one of the set of UEs, or combinations thereof.

In some aspects, the location information comprises global positioning system (GPS) information.

In some aspects, the ranging data further indicates a range from the first PUE to the RSU.

In some aspects, the request indicates that the ranging operation to the set of UEs is to be performed periodically.

In some aspects, the request identifies a trigger condition upon detection of which the ranging operation is to be performed.

In some aspects, the trigger condition comprises detecting that the first PUE is within, or within a threshold distance from, a predetermined geographic area.

In some aspects, the predetermined geographic area is specified by the RSU, by the VUE, or by a third entity.

In some aspects, the set of UEs is selected by the first PUE.

In some aspects, the set of UEs is selected by the RSU or by the VUE and the request to perform the ranging operation comprises information identifying the set of UEs.

In some aspects, at least one member of the set of UEs is selected based on: a battery level of the at least one member; a battery level of another member of the set of UEs a trajectory or anticipated trajectory of the one member; a proximity or anticipated proximity of the one member to a danger or hazard; a proximity or anticipated proximity of the one member to another member of the set of UEs; a level of confidence of a geographic location of the one member; a capability of the one member; a mobility status of the one member; a number or relative density of PUEs in, or anticipated to be in, a vicinity of the one member; or combinations thereof.

In some aspects, a number of UEs in the set of UEs is based on a number or relative density of PUEs in, or anticipated to be in, a vicinity of the first PUE.

In some aspects, the vicinity of the first PUE comprises an area having the first PUE as center and a preconfigured radius.

In some aspects, the number of UEs in the set of UEs is calculated as a preconfigured number of PUEs in the vicinity of the first PUE or a preconfigured percentage of the density of PUEs in the vicinity of the first PUE.

In some aspects, the preconfigured number or the preconfigured percentage is selected based on one or more density thresholds of the density of PUEs in the vicinity of the first PUE.

In an aspect, a pedestrian user equipment (PUE) includes a memory; at least one transceiver; and at least one processor communicatively coupled to the memory and the at least one transceiver, the at least one processor configured to: perform a ranging operation to a set of user equipment (UEs), the set comprising at least a second PUE; and provide ranging data to a third entity, the third entity comprising a vehicle user equipment (VUE) or a road-side unit (RSU).

In some aspects, where the ranging data comprises location information, the location information identifying a location of the first PUE, a location of at least one of the set of UEs, or combinations thereof.

In some aspects, the location information comprises global positioning system (GPS) information.

In some aspects, the third entity is a member of the set of UEs.

In some aspects, the ranging operation to the set of UEs is performed periodically.

In some aspects, the ranging operation to the set of UEs is performed in response to detecting a trigger condition.

In some aspects, the at least one processor, when detecting the trigger condition, is configured to detect that the first PUE is within, or within a threshold distance from, a predetermined geographic area.

In some aspects, the predetermined geographic area is specified by the third entity.

In some aspects, the at least one processor, when detecting the trigger condition, is configured to receive a request to perform the ranging operation.

In some aspects, the request to perform the ranging operation is received from the third entity, from the second PUE, or from a third PUE.

In some aspects, the set of UEs is selected by the third entity and the request to perform the ranging operation comprises information identifying the set of UEs.

In some aspects, the set of UEs is selected by the first PUE.

In some aspects, at least one member of the set of UEs is selected based on: a battery level of the at least one member; a battery level of another member of the set of UEs; a trajectory or anticipated trajectory of the one member; a proximity or anticipated proximity of the one member to a danger or hazard; a proximity or anticipated proximity of the one member to another member of the set of UEs; a level of confidence of a geographic location of the one member; a capability of the one member; a mobility status of the one member; or combinations thereof.

In some aspects, a number of UEs in the set of UEs is based on a number or relative density of PUEs in, or anticipated to be in, a vicinity of the first PUE.

In some aspects, the vicinity of the first PUE comprises an area having the first PUE as center and a preconfigured radius.

In some aspects, the number of UEs in the set of UEs is calculated as a preconfigured number of PUEs in the vicinity of the first PUE or a preconfigured percentage of the density of PUEs in the vicinity of the first PUE.

In some aspects, the preconfigured number or the preconfigured percentage is selected based on one or more density thresholds of the density of PUEs in the vicinity of the first PUE.

In an aspect, a vehicle user equipment (VUE) includes a memory; at least one transceiver; and at least one processor communicatively coupled to the memory and the at least one transceiver, the at least one processor configured to: send, to a first pedestrian user equipment (PUE), a request to perform a ranging operation to a set of user equipment (UEs), the set comprising at least a second PUE; receive, from the first PUE, ranging data indicating a range from the first PUE to each member of the set of UEs; and determine, based on the ranging data, an estimated position for each UE in the set of UEs.

In some aspects, where the ranging data comprises location information, the location information identifying a location of the first PUE, a location of at least one of the set of UEs, or combinations thereof.

In some aspects, the location information comprises global positioning system (GPS) information.

In some aspects, the ranging data further indicates a range from the first PUE to the VUE.

In some aspects, the request indicates that the ranging operation to the set of UEs is to be performed periodically.

In some aspects, the request identifies a trigger condition upon detection of which the ranging operation is to be performed.

In some aspects, the trigger condition comprises detecting that the first PUE is within, or within a threshold distance from, a predetermined geographic area.

In some aspects, the predetermined geographic area is specified by the VUE or by a third entity.

In some aspects, the set of UEs is selected by the VUE and the request to perform the ranging operation comprises information identifying the set of UEs.

In some aspects, the set of UEs is selected by the first PUE.

In some aspects, at least one member of the set of UEs is selected based on: a battery level of the at least one member; a battery level of another member of the set of UEs; a trajectory or anticipated trajectory of the one member; a proximity or anticipated proximity of the one member to a danger or hazard; a proximity or anticipated proximity of the one member to another member of the set of UEs; a level of confidence of a geographic location of the one member; a capability of the one member; a mobility status of the one member; or combinations thereof.

In some aspects, a number of UEs in the set of UEs is based on a number or relative density of PUEs in, or anticipated to be in, a vicinity of the first PUE.

In some aspects, the vicinity of the first PUE comprises an area having the first PUE as center and a preconfigured radius.

In some aspects, the number of UEs in the set of UEs is calculated as a preconfigured number of PUEs in the vicinity of the first PUE or a preconfigured percentage of the density of PUEs in the vicinity of the first PUE.

In some aspects, the preconfigured number or the preconfigured percentage is selected based on one or more density thresholds of the density of PUEs in the vicinity of the first PUE.

In an aspect, a road-side unit (RSU) includes a memory; at least one transceiver; and at least one processor communicatively coupled to the memory and the at least one transceiver, the at least one processor configured to: send, to a first pedestrian user equipment (PUE), a request to perform a ranging operation to a set of user equipment (UEs), the set comprising at least a second PUE; receive, from the first PUE, ranging data indicating a range from the first PUE to each member of the set of UEs; and send, to a vehicle UE (VUE), the ranging data, an estimated position of each member of the set of UEs, or combinations thereof.

In some aspects, where the ranging data comprises location information, the location information identifying a location of the first PUE, a location of at least one of the set of UEs, or combinations thereof.

In some aspects, the location information comprises global positioning system (GPS) information.

In some aspects, the ranging data further indicates a range from the first PUE to the RSU.

In some aspects, the request indicates that the ranging operation to the set of UEs is to be performed periodically.

In some aspects, the request identifies a trigger condition upon detection of which the ranging operation is to be performed.

In some aspects, the trigger condition comprises detecting that the first PUE is within, or within a threshold distance from, a predetermined geographic area.

In some aspects, the predetermined geographic area is specified by the RSU, by the VUE, or by a third entity.

In some aspects, the set of UEs is selected by the first PUE.

In some aspects, the set of UEs is selected by the RSU or by the VUE and the request to perform the ranging operation comprises information identifying the set of UEs.

In some aspects, at least one member of the set of UEs is selected based on: a battery level of the at least one member; a battery level of another member of the set of UEs a trajectory or anticipated trajectory of the one member; a proximity or anticipated proximity of the one member to a danger or hazard; a proximity or anticipated proximity of the one member to another member of the set of UEs; a level of confidence of a geographic location of the one member; a capability of the one member; a mobility status of the one member; a number or relative density of PUEs in, or anticipated to be in, a vicinity of the one member; or combinations thereof.

In some aspects, a number of UEs in the set of UEs is based on a number or relative density of PUEs in, or anticipated to be in, a vicinity of the first PUE.

In some aspects, the vicinity of the first PUE comprises an area having the first PUE as center and a preconfigured radius.

In some aspects, the number of UEs in the set of UEs is calculated as a preconfigured number of PUEs in the vicinity of the first PUE or a preconfigured percentage of the density of PUEs in the vicinity of the first PUE.

In some aspects, the preconfigured number or the preconfigured percentage is selected based on one or more density thresholds of the density of PUEs in the vicinity of the first PUE.

In an aspect, a pedestrian user equipment (PUE) includes means for performing a ranging operation to a set of user equipment (UEs), the set comprising at least a second PUE; and means for providing ranging data to a third entity, the third entity comprising a vehicle user equipment (VUE) or a road-side unit (RSU).

In an aspect, a vehicle user equipment (VUE) includes means for sending, to a first pedestrian user equipment (PUE), a request to perform a ranging operation to a set of user equipment (UEs), the set comprising at least a second PUE; means for receiving, from the first PUE, ranging data indicating a range from the first PUE to each member of the set of UEs; and means for determining, based on the ranging data, an estimated position for each UE in the set of UEs.

In an aspect, a road-side unit (RSU) includes means for sending, to a first pedestrian user equipment (PUE), a request to perform a ranging operation to a set of user equipment (UEs), the set comprising at least a second PUE; means for receiving, from the first PUE, ranging data indicating a range from the first PUE to each member of the set of UEs; and means for sending, to a vehicle UE (VUE), the ranging data, an estimated position of each member of the set of UEs, or combinations thereof.

In an aspect, a non-transitory computer-readable medium storing a set of instructions, the set of instructions comprising one or more instructions that, when executed by one or more processors of a pedestrian user equipment (PUE), cause the PUE to: perform a ranging operation to a set of user equipment (UEs), the set comprising at least a second PUE; and provide ranging data to a third entity, the third entity comprising a vehicle user equipment (VUE) or a road-side unit (RSU).

In an aspect, a non-transitory computer-readable medium storing a set of instructions, the set of instructions comprising one or more instructions that, when executed by one or more processors of a vehicle user equipment (VUE), cause the VUE to: send, to a first pedestrian user equipment (PUE), a request to perform a ranging operation to a set of user equipment (UEs), the set comprising at least a second PUE; receive, from the first PUE, ranging data indicating a range from the first PUE to each member of the set of UEs; and determine, based on the ranging data, an estimated position for each UE in the set of UEs.

In an aspect, a non-transitory computer-readable medium storing a set of instructions, the set of instructions comprising one or more instructions that, when executed by one or more processors of an road-side unit (RSU), cause the RSU to: send, to a first pedestrian user equipment (PUE), a request to perform a ranging operation to a set of user equipment (UEs), the set comprising at least a second PUE; receive, from the first PUE, ranging data indicating a range from the first PUE to each member of the set of UEs; and send, to a vehicle UE (VUE), the ranging data, an estimated position of each member of the set of UEs, or combinations thereof.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A pedestrian user equipment (PUE), comprising:
 a memory;
 at least one transceiver; and
 at least one processor communicatively coupled to the memory and the at least one transceiver, the at least one processor configured to:
  perform a ranging operation to a set of user equipment (UEs), the set of UEs comprising at least a second PUE; and
  provide ranging data to a third entity, the ranging data indicating a range from the PUE to each member of the set of UEs, the third entity comprising a vehicle user equipment (VUE) or a road-side unit (RSU).

2. The PUE of claim 1, where the ranging data comprises location information, the location information identifying a location of the PUE, a location of at least one of the set of UEs, or combinations thereof.

3. The PUE of claim 1, wherein the at least one processor is configured to perform the ranging operation to the set of UEs periodically, in response to detecting a trigger condition, or combinations thereof.

4. The PUE of claim 3, wherein the at least one processor, when detecting the trigger condition, is configured to detect that the PUE is within, or within a threshold distance from, a predetermined geographic area.

5. The PUE of claim 1, wherein at least one member of the set of UEs is selected based on:
 a battery level of the at least one member;
 a battery level of another member of the set of UEs;
 a trajectory or anticipated trajectory of the one member;
 a proximity or anticipated proximity of the one member to a danger or hazard;
 a proximity or anticipated proximity of the one member to another member of the set of UEs;
 a level of confidence of a geographic location of the one member;
 a capability of the one member;
 a mobility status of the one member; or
 combinations thereof.

* * * * *